(12) United States Patent
Zhuge et al.

(10) Patent No.: US 7,580,944 B2
(45) Date of Patent: Aug. 25, 2009

(54) BUSINESS INTELLIGENT ARCHITECTURE SYSTEM AND METHOD

(75) Inventors: Yue Zhuge, Palo Alto, CA (US); Mahmoud Alnahlawi, Campbell, CA (US)

(73) Assignee: Yahoo! Inc., Sunnyvale, CA (US)

( * ) Notice: Subject to any disclaimer, the term of this patent is extended or adjusted under 35 U.S.C. 154(b) by 452 days.

(21) Appl. No.: 11/493,950

(22) Filed: Jul. 27, 2006

(65) Prior Publication Data

US 2008/0027970 A1 Jan. 31, 2008

(51) Int. Cl.
*G06F 7/00* (2006.01)
(52) U.S. Cl. .................. 707/102; 707/101; 707/4; 707/103 R; 715/214; 715/215; 715/700
(58) Field of Classification Search ............. 707/103 R, 707/102, 101
See application file for complete search history.

(56) References Cited

U.S. PATENT DOCUMENTS

| | | | |
|---|---|---|---|
| 2002/0116389 A1* | 8/2002 | Chen et al. | 707/103 R |
| 2005/0038629 A1* | 2/2005 | Amaru et al. | 702/179 |
| 2005/0119922 A1* | 6/2005 | Eder | 705/7 |
| 2008/0208828 A1* | 8/2008 | Boiman et al. | 707/4 |

* cited by examiner

*Primary Examiner*—John R. Cottingham
*Assistant Examiner*—Alexandria Y Bromell
(74) *Attorney, Agent, or Firm*—James J. DeCarlo; Greenberg Traurig, LLP

(57) ABSTRACT

The present disclosure describes a standardized logical model architecture, for use in building a business intelligent systems, and a system and method of using the logical model architecture to populate a data repository (e.g., a data mart/warehouse) with the data to satisfy reporting and data analysis needs.

13 Claims, 18 Drawing Sheets

Figure 1A:
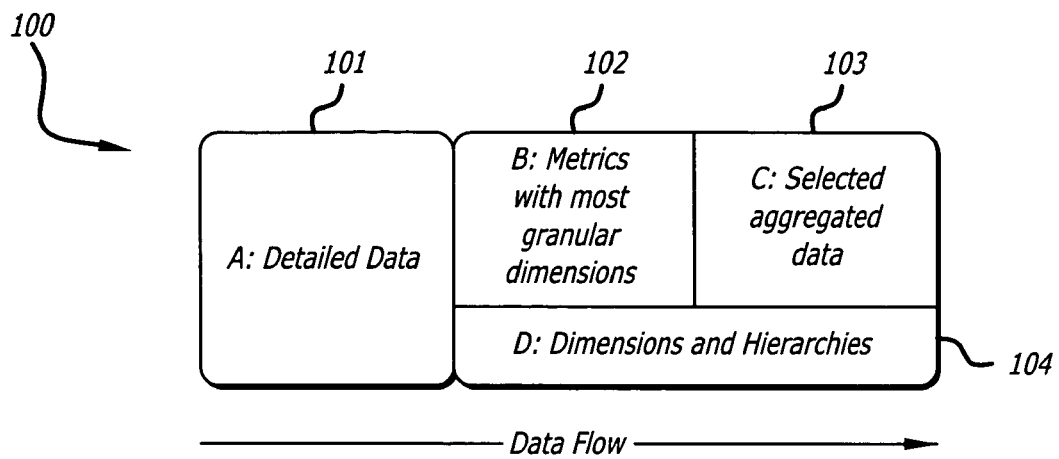

```
<DIM-GROUP name="Time" inStars="complete">
  <HIE>
    <DIM>DATE</DIM>
  </HIE>
</DIM-GROUP>

<DIM-GROUP name="Business_Unit_H" inStars="complete">
  <HIE>
    <DIM>Business_Unit</DIM>
  </HIE>
</DIM-GROUP>

<DIM-GROUP name="User_Type" inStars="complete">
  <HIE>
    <DIM>USER_USER_ID</DIM>
    <DIM>USER_GENDER</DIM>
  </HIE>
</DIM-GROUP>

<STAR name="complete" ofDGs="Time, Business_Unit_H, User_Type" inMetrics="view, click>
</STAR>

<METRIC name="view" wStar="complete">
  <MAP> COUNTIF (MAIN_FACT.EVENT="VIEW")<MAP>
</METRIC>

<METRIC name="click" wStar="complete">
  <MAP> COUNTIF (MAIN_FACT.EVENT="VIEW")</AGG>
</METRIC>
```

FIG. 17

FIG. 18A

| Metrics | Hierarchies | Dimensions | | | | | | |
|---|---|---|---|---|---|---|---|---|
| Metrics | | | | | | | | Create New Metric |
| Edit | Copy | Delete | | | | | Show [10▼] Lines Metrics 1-5 of 5 \|First \|Prev \|Next \|Last | |
| | | | | Retrieval Mappings | | | | |
| ☐ | ID | Name ⊞ | Aggregate Function | Esterfeed Name | Field Name | Function | Allowed in Hierarchies | Modified By | Date Modified |
| ☐ | 1 | Pageviews | sum | ULT_yahoo_b_daily | type | countif | Time1<br>Page1<br>UserType1<br>Gender1<br>Age1<br>Browser1<br>OS1 | evanzeng | 22-Aug-2005 |
| ☐ | 2 | Pageclicks | sum | ULT_yahoo_b_daily | type | countif | Time1<br>Page1<br>UserType1<br>Gender1<br>Age1<br>Browser1<br>OS1 | evanzeng | 22-Aug-2005 |
| ☐ | 3 | Linkviews | sum | ULT_yahoo_b_daily | type | countif | Time1<br>Link1<br>ContentProvider1<br>Module1<br>Topic1<br>UserType1<br>Gender1 | evanzeng | 22-Aug-2005 | javascript onclick_a_tab(tab_admin_metrics.php','theForm'):

Dimensions
   *day, month, year, spaceid, pageType, pageLevel, pageTemplate*

Hierarchies
  <u>Logical Representation</u>
     *Time1:=(day->month->year)*
     *Page1:=(spaceid->pageType->pageLevel->pageTemplate)*
  <u>Relational Representation</u>
     *Table_Time1(day, month, year),*
     *Table_Page1(spaceid, pageType, pageLevel, pageTemplate).*

Roll-up Operations
  *(page views, Time1, sum)*
  *(page views, Page1, sum)*

Metric-Star Interface
  <u>Logical Representation</u>
     *(page views, (day, spaceid))*
  <u>Relational Representation</u>
     *Table_Metric(page views, day, spaceid).*

Data Model Interface
  <u>Logical Representation</u>
     *(page views, (day, pageType))*
     *(page views, (month))*
     *(page views, (year, spaceid))*
  <u>Relational Representation</u>
     *Table_A(page views, day, pageType)*
     *Table_B(page views, month)*
     *Table_C(page views, year, spaceid)*

*FIG. 19A*

Table_A(pageviews, day, pageType)
    Select sum(pageviews), day, pageType
    from Table_time1, Table_page1, Table_metric     — 1930
    where Table_time1.day=Table_metric.day
        and
        Table_page1.spaceid=Table_metric.spaceid
    group by day, pageType Table_B(pageviews, month)
    Select sum(pageviews), month
    from Table_time1, Table_page1, Table_metric     — 1940
    where Table_time1.day=Table_metric.day
        and
        Table_page1.spaceid=Table_metric.spaceid
    group by month Table_C(pageviews, year, spaceid)
    Select sum(pageviews), year, spaceid
    from Table_time1, Table_page1, Table_metric     — 1960
    where Table_time1.day=Table_metric.day
        and
        Table_page1.spaceid=Table_metric.spaceid
    group by dyear, spaceid

*FIG. 19C*

BUSINESS INTELLIGENT ARCHITECTURE SYSTEM AND METHOD

FIELD OF THE INVENTION

The present disclosure relates to business intelligent systems, and more particularly to a logical model architecture and a system and method of building business intelligent systems using the logical model architecture.

BACKGROUND

A conventional approach to a business intelligent (BI) system, which is also referred to as a business intelligence system, typically consists of populating a data repository which is managed using a database management system, such as a relational database management system (RDBMS), and then defining reports and other output using reporting and analysis tools, such as an online analytical processing ("OLAP") tool, to report or provide analysis using the data stored in the data repository.

In such a conventional approach, a reporting tool is typically used to define the data items to be reported, and the level of detail that is to be reported for each data item in a report. In order to accommodate potential reporting and analysis requirements, the data repository is designed to include data items at a lowest level of detail. For example, assume that the data repository includes a data item that reflects detailed purchase data. In this example, for the data repository, the RDBMS includes a table, e.g., a purchase table, which includes a row for each purchase and has column for the purchase amount, together with columns that provide information for use in aggregating the purchase amount, e.g., date of purchase, store in which purchase was made, product identifier, product line, etc.

While a report can be defined that outputs detailed information for each purchase, this type of report is typically not as useful as a report that aggregates the purchase information, such as revenue by store, daily revenue, revenue by product, revenue by product line, quarterly revenue, revenue by geographic region, for example. Unless an entity's BI requirements are known before a data repository is populated, the data repository must be designed to include a low level of detail in order to anticipate the entity's BI requirements. Methodologies such as the Kimball methodology provide general guidelines which define the type of data that should be stored in a data repository for a given application (e.g., finance, sales, human resources, etc.). However, use of such a methodology can lead to inefficiencies, since the methodology does not take into account the actual BI requirements of a specific entity. A practice of building a data repository without determining the actual data needs of an entity based on the entity's BI requirements can lead to an unnecessary expenditure of resources to design, store and maintain the data repository.

Building a conventional business intelligent (BI) system can involve sifting through large amounts of data to identify information to be stored in the data repository, extracting the identified information, and collecting the extracted information into the data repository (e.g., a data mart). Data might need to be collected from multiple sources into a data warehouse or data mart.

In practice, the process of building a BI system is an art. This practice is especially inefficient in view of the fact that the design and development of a BI system can involve a number of steps. The present inventors have determined that it can take a four-person team approximately three to six months to design and development a first version of a data mart. New teams are formed to build new data marts and systems independent of other development efforts. Examples of some of the steps involved in designing and developing a BI system include: 1) identifying data to be stored in the data repository (e.g., using the Kimball methodology), 2) tagging data for collection, 3) loading the data into a data warehouse and aggregating multiple data sources, 4) aggregating and extracting data from the data warehouse to flat files, for importation into a data mart, 5) loading the data from the flat files into the data mart, 6) designing a base-line schema for aggregation files, 7) designing a schema and the objects for reporting, 8) designing reporting and presentation layout, and 9) data validation and error checking.

Implementation typically involves either writing code manually, and/or using commercial tools to load data. Different data marts are often built for different departments in the same company, or for different reporting/analysis tools. Since each system is designed and developed independently, such that there is no uniformity across systems, efforts in the design, development, implementation and maintenance of multiple data warehouses/marts are duplicated, which can negatively impact a business. In addition, it is difficult to determine the capabilities (e.g., for reporting and analysis) of each system, thereby making it difficult to build from the current capabilities of an existing system when designing a new system. Further, efforts to maintain and enhance each of the independently-developed data marts and systems are performed independently, thereby adding to costs associated with a BI system.

SUMMARY

The present disclosure seeks to address failings in the art and to provide a systematic approach to building a BI system. Embodiments of the present disclosure use a logical model architecture, which can be used to build a structure for a data repository and populate the data repository. The data repository providing data which can be operated on by one or more reporting and/or analysis tools of a BI system so as to satisfy such needs as the reporting and data analysis of a business enterprise or other entity.

In accordance with one or more embodiments, a method is provided which defines a first, second and third interfaces, and first and second sets of transformations of a logical model architecture. The first interface comprises one or more dimensions and/or measures. The second interface of the logical model architecture comprises metrics, and associations between the metrics and the one or more dimensions and/or measures. The third interface of the logical model architecture comprises a plurality of user data requirements, each of which identifies at least one of the metrics and at least one of the dimensions and/or measures. The first set of transformations of the logical model architecture comprise one or more transformations to map source data items to the one or more dimensions and/or measures of the first interface. Each transformation in the second set of transformations of the logical model architecture corresponds to at least one of the user data requirements, and is for use in populating a data repository with data to satisfy the corresponding user data requirement.

In accordance with one or more embodiments disclosed herein, a dimension represents a data item, such as a source data item, by which at least one other data item, such as a source data item or a derived data item, can be grouped, and a measure represents a source data item other than those data items represented by a dimension.

In accordance with one or more embodiments disclosed herein, a metric identified in a user data requirement in the third interface of the logical model architecture corresponds to one or more output data items of a BI system, which BI system comprises reporting and analysis tools to operate on the data repository.

In accordance with one or more embodiments disclosed herein, the second set of transformations of the logical model architecture are defined by defining at least one star graph having nodes, each node corresponding to a star identifying at least one of the dimensions, each of the dimensions identified in the star belonging to a dimension hierarchy, an edge between two nodes representing one or more aggregation operations such that each node corresponds to a level of aggregation for each of the dimensions identified by the star, and traversing the star graph so as to determine the level of aggregation level for a metric corresponding to star. In accordance with at least one embodiment, an aggregation operation comprises a roll-up operation to roll a child dimension into its parent dimension, and the roll-up operation operates the define a level of aggregation for a metric associated with the child and parent dimensions, such that the associated metric is grouped by the parent dimension.

In accordance with another embodiment, a set of dimensions and a set of dimension hierarchies are defined. Each dimension hierarchy identifies a plurality of dimensions from the set of dimensions and hierarchical relationships between the dimensions in the plurality. A set of metrics and a set of aggregation operations are defined, and a set of BI data requirement specifications are identified. Each of data requirement specification in the defined set of BI data requirement specifications comprises a metric from the set of metrics, at least one dimension hierarchy corresponding to the metric the set of dimension hierarchies, at least one dimension of the at least one dimension hierarchy and at least one aggregation operation. A data structure of a data repository is determined based on the set of BI data requirement specifications, and a data repository is populated in accordance with the determined data structure.

DRAWINGS

Figure 1B:
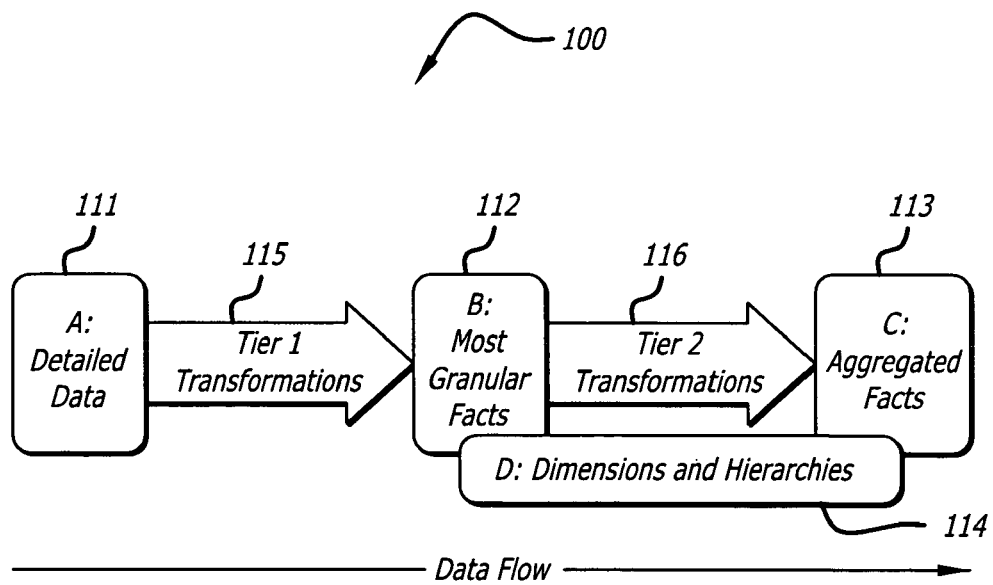

The above-mentioned features and objects of the present disclosure will become more apparent with reference to the following description taken in conjunction with the accompanying drawings wherein like reference numerals denote like elements and in which:

FIG. 1, which comprises FIGS. 1A and 1B, provides an overview of a logical model used in accordance with one or more embodiments of the present disclosure.

Figure 2A:
Figure 2B:
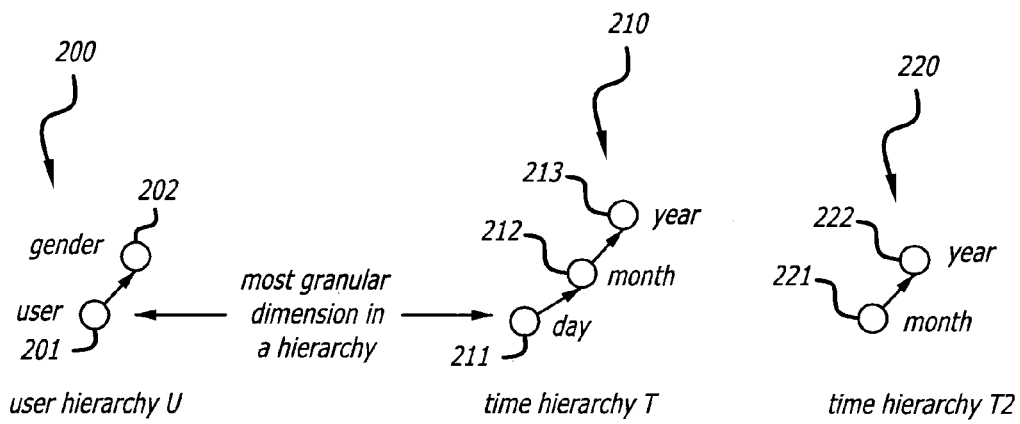
Figure 2C:
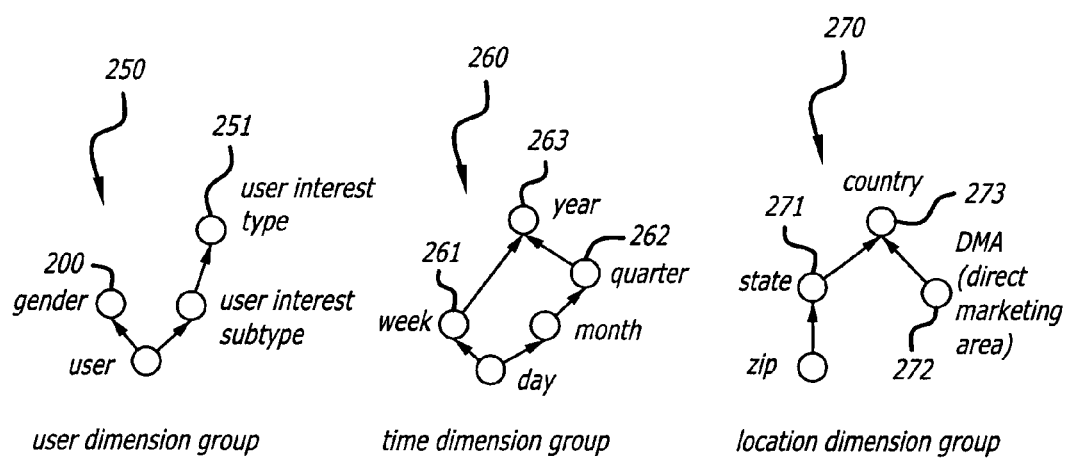

FIG. 2, which comprises FIGS. 2A to 2C, provides examples of a dimension, dimension hierarchy and dimension group in accordance with one or more embodiments of the present disclosure.

Figure 3:
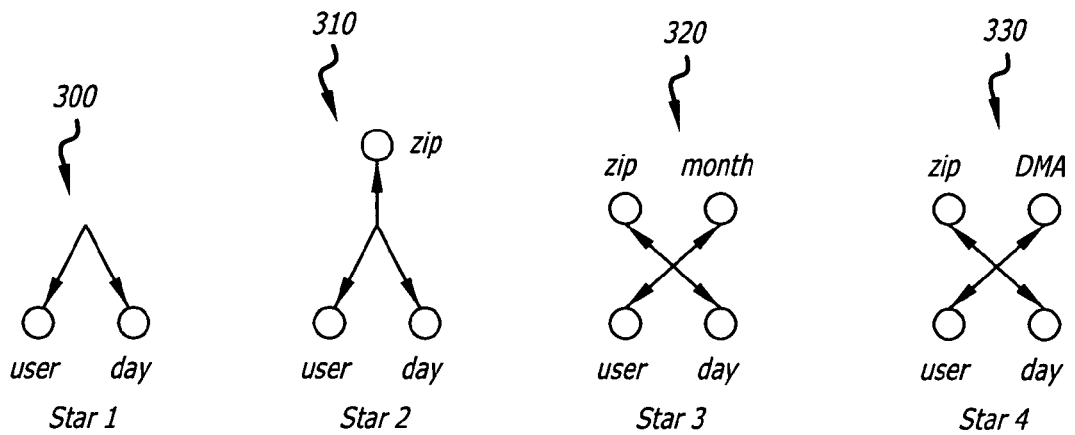

FIG. 3 provides examples of stars and associated dimensions in accordance with one or more embodiments of the invention.

Figure 4:
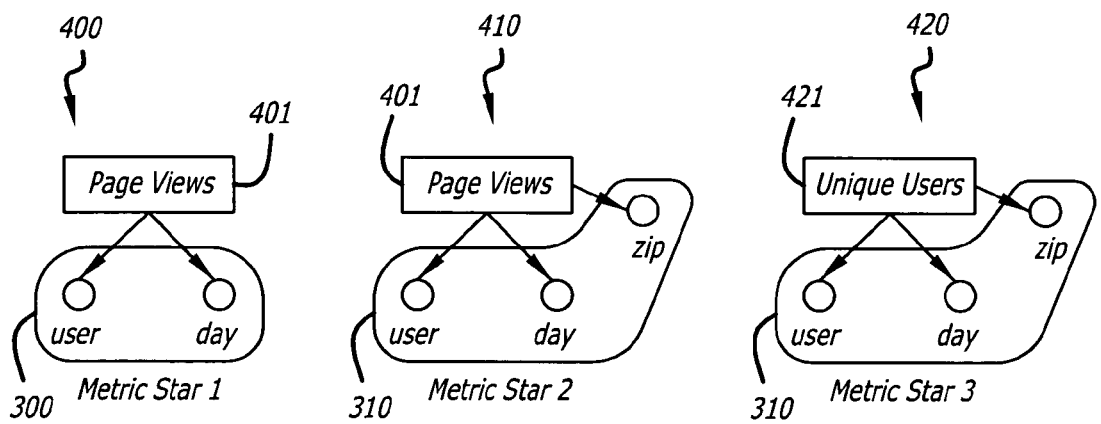

FIG. 4 provides examples of metrics and associated stars in accordance with one or more embodiments of the present disclosure.

Figure 5:
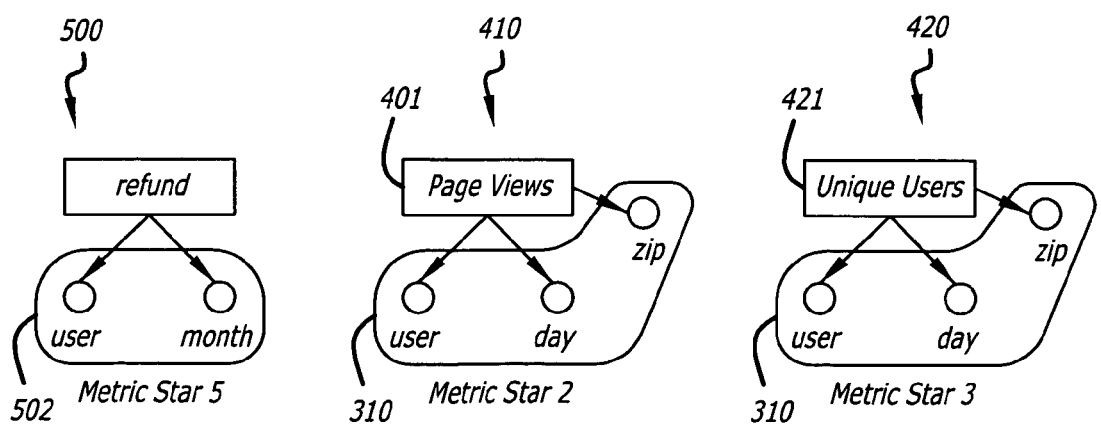

FIG. 5 illustrates a collection of metric-stars of a bridge interface in accordance with embodiments of the present disclosure.

Figure 6:
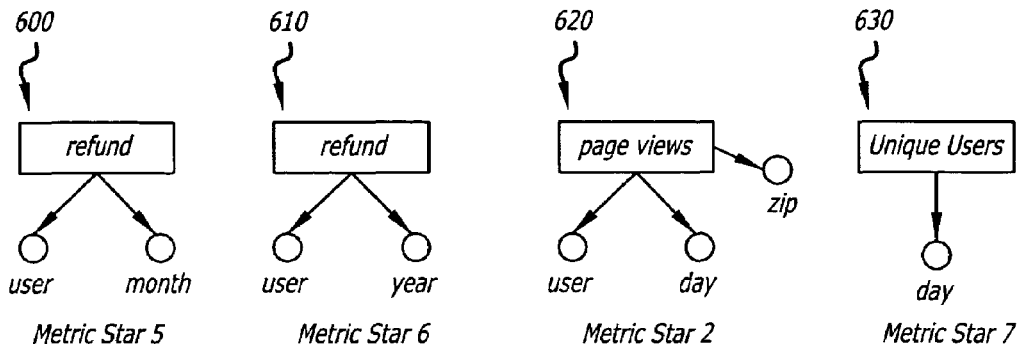

FIG. 6 provides an example of a target interface comprising a collection of metric-stars in accordance with embodiments of the invention.

Figure 7A:
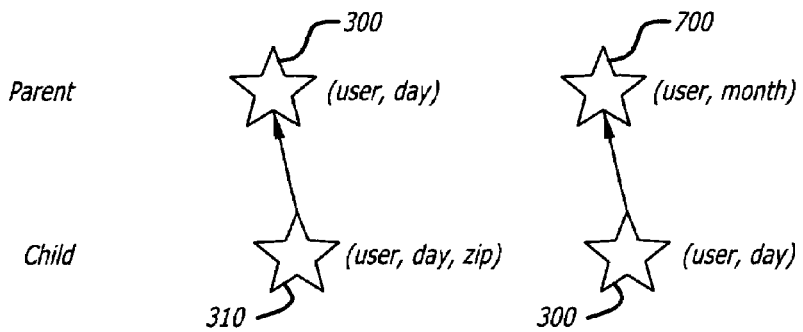
Figure 7B:
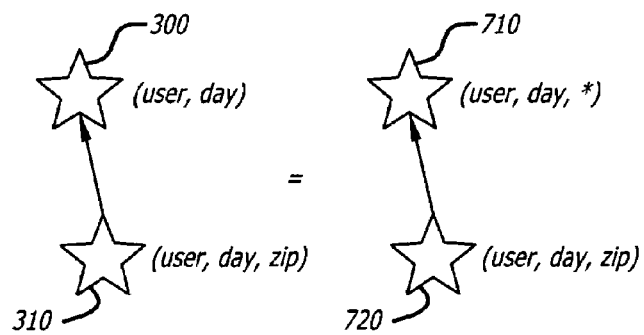

FIG. 7, which comprises FIGS. 7A and 7B, provides examples of star hierarchies in accordance with at least one embodiment of the disclosure.

Figure 8:
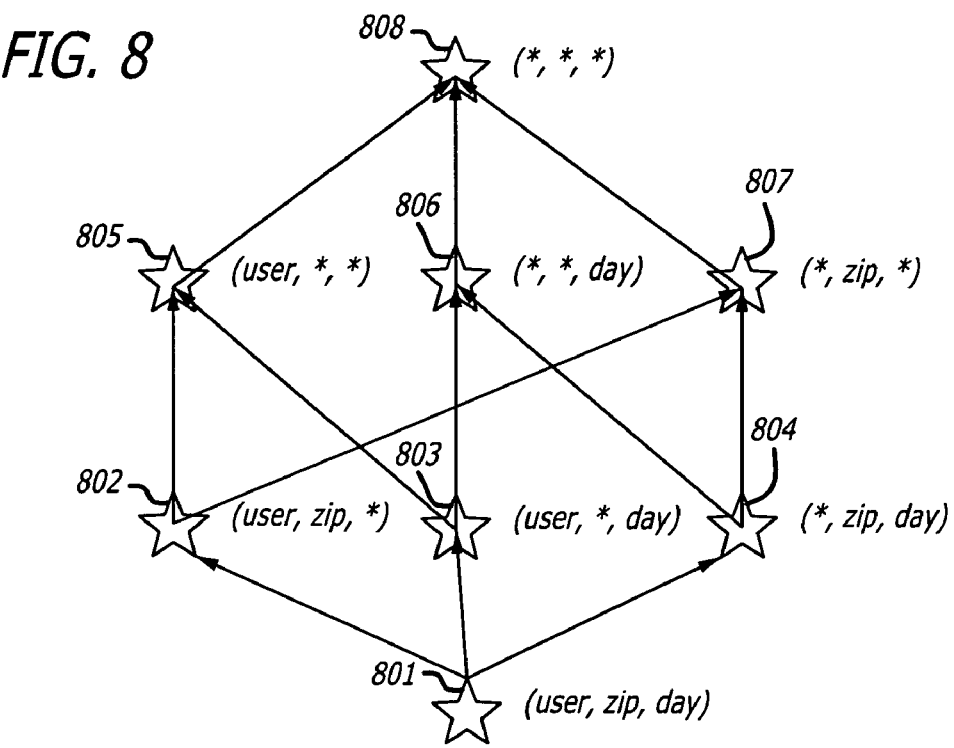

FIG. 8 provides an illustrative representation of a star graph using user, zip and day hierarchies in accordance with at least one embodiment of the invention.

Figure 9:
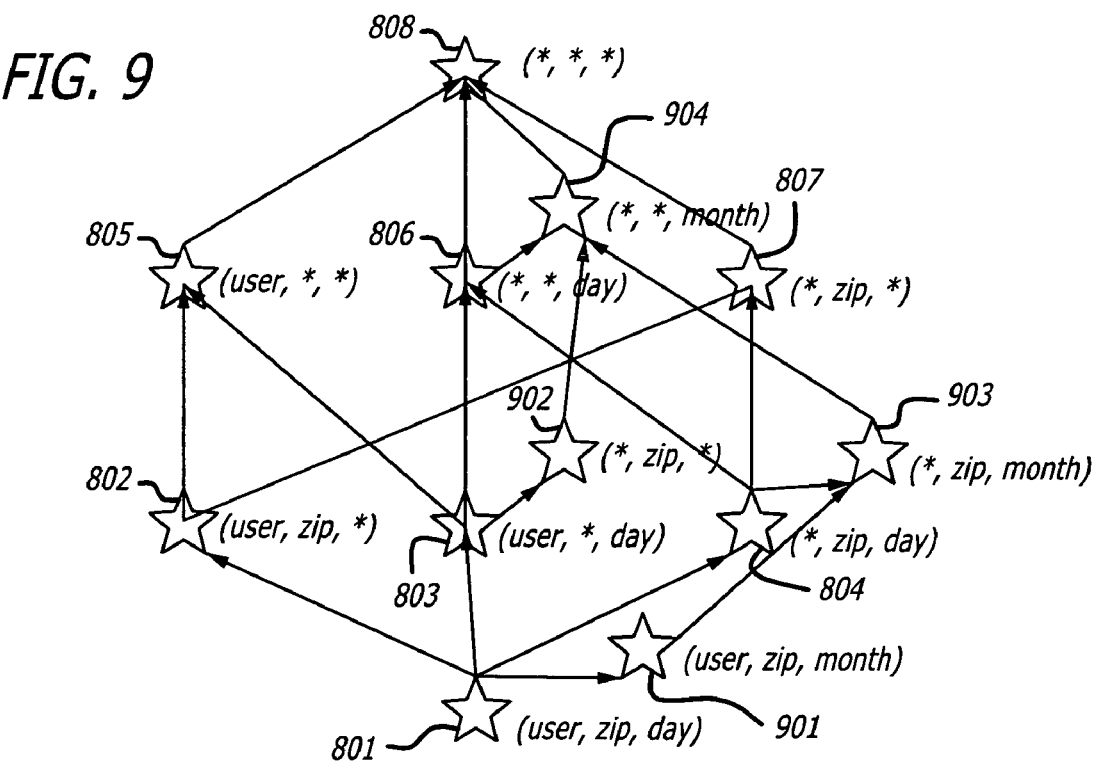

FIG. 9 provides additional examples of a roll-up relationship between stars in a star graph in accordance with one or more embodiments of the invention.

Figure 10:
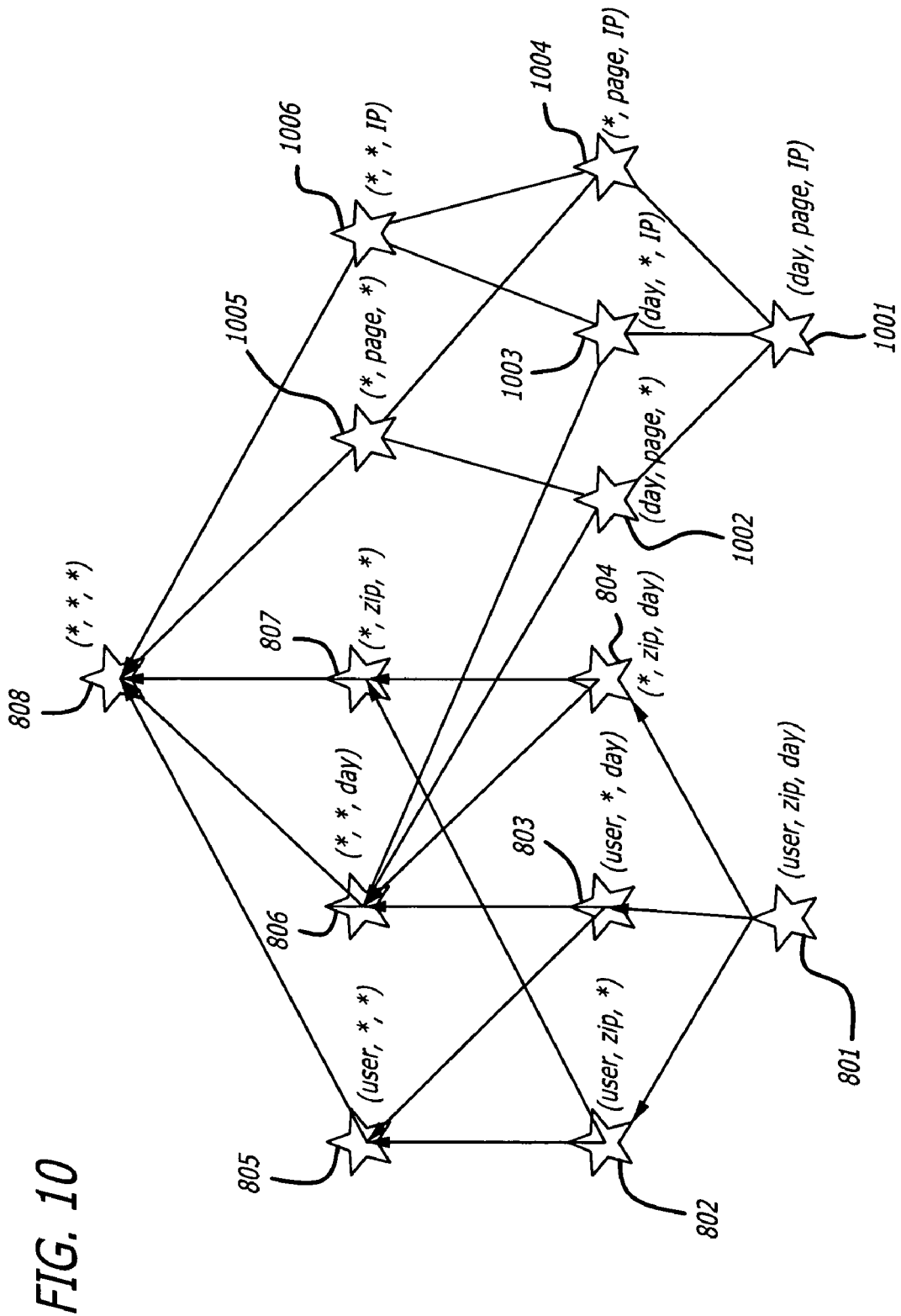

FIG. 10 provides an example of a star graph and events used to group dimensions in accordance with one or more embodiments of the invention.

Figure 11:
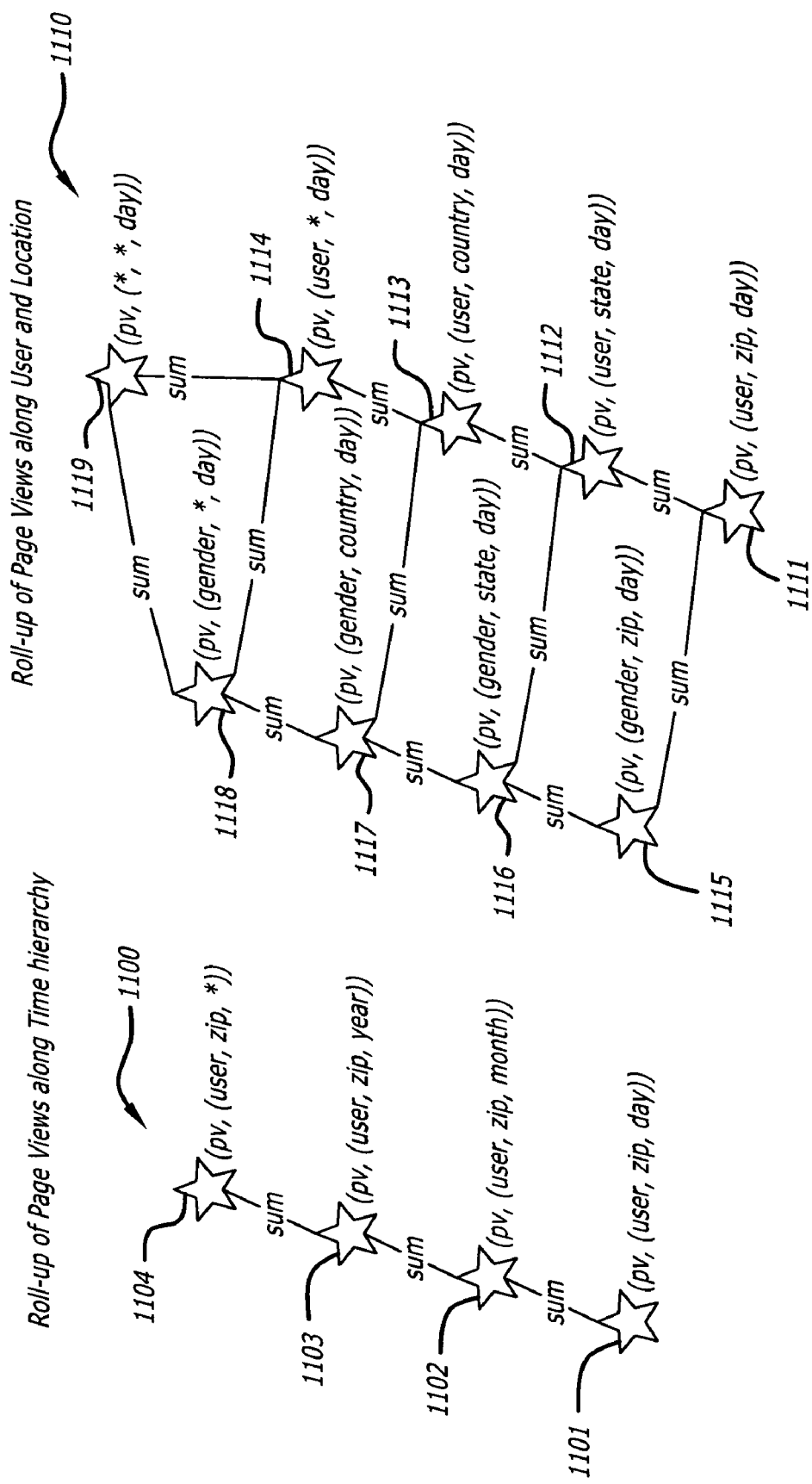

FIG. 11 provides examples of a roll-up operation by metric and hierarchy in accordance with one or more embodiments of the present disclosure.

Figure 12:
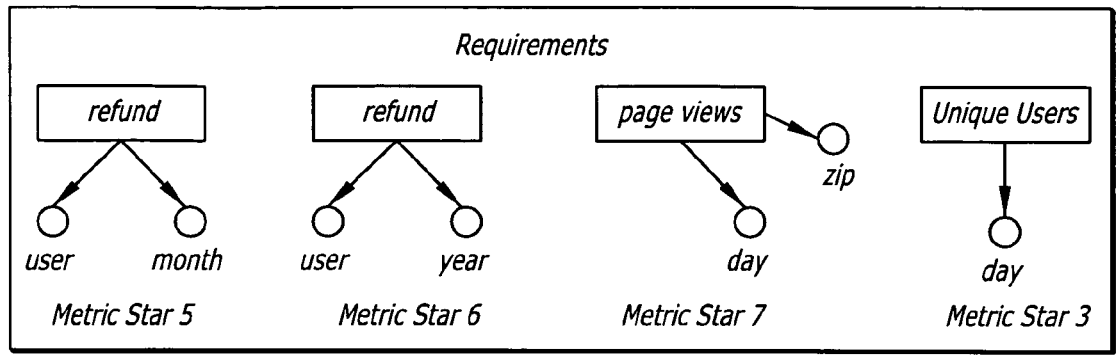

FIG. 12 provides an example of a set of requirements in accordance with at least one embodiment of the invention.

Figure 13:
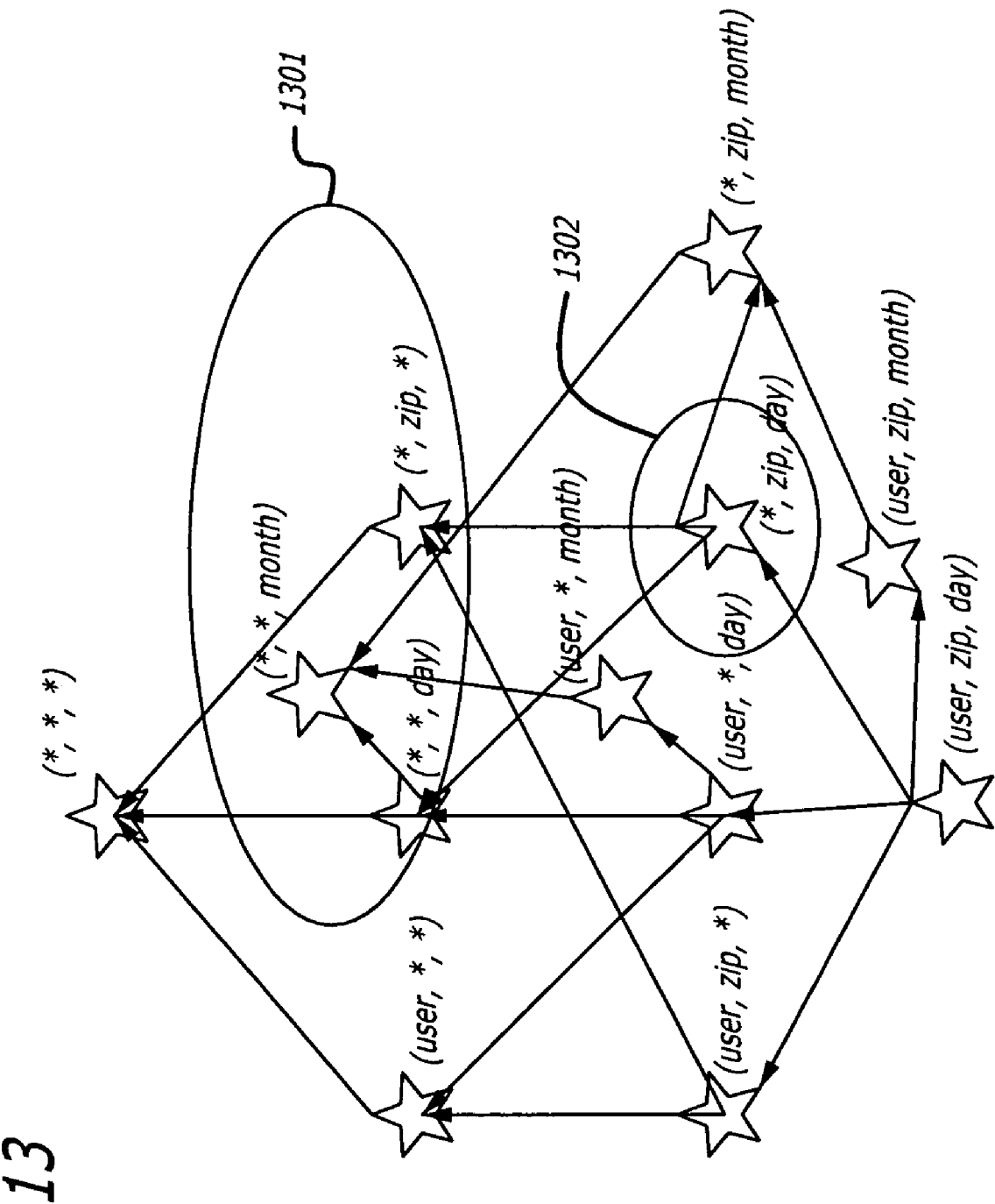

FIG. 13 provides an example of a star graph illustrating levels of detail and aggregation for use in determining data components of a target interface based on identified requirements in accordance with one or more embodiments of the disclosure.

Figure 14:
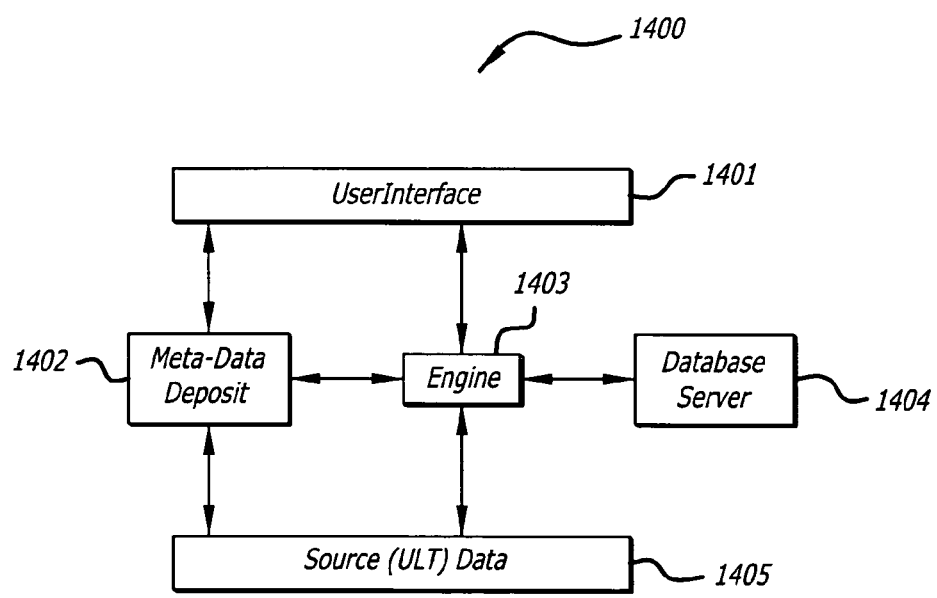

FIG. 14 provides an example of an architecture for use in a BISKIT system in accordance with one or more embodiments of the present disclosure.

Figure 15:
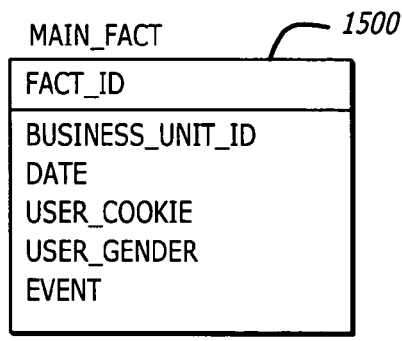

FIG. 15 provides an example of a universal table of a data source for use with a BISKIT system in accordance with one or more embodiments of the present disclosure.

Figure 16:
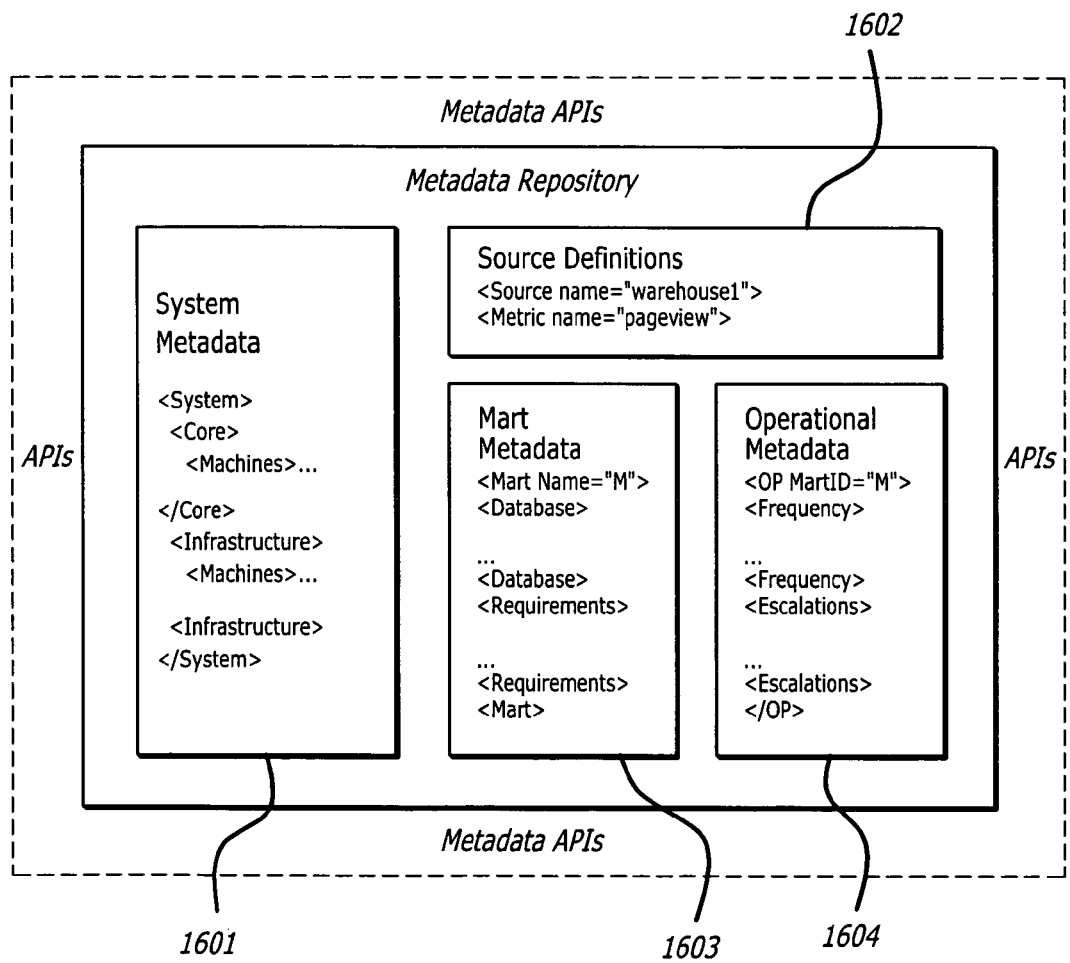

FIG. 16 provides an example of metadata components and application programming interfaces of a BISKIT system in accordance with one or more embodiments of the present disclosure.

FIG. 17 provides an example of metadata used in a BISKIT system in accordance with one or more embodiments of the present disclosure.

Figure 18B:
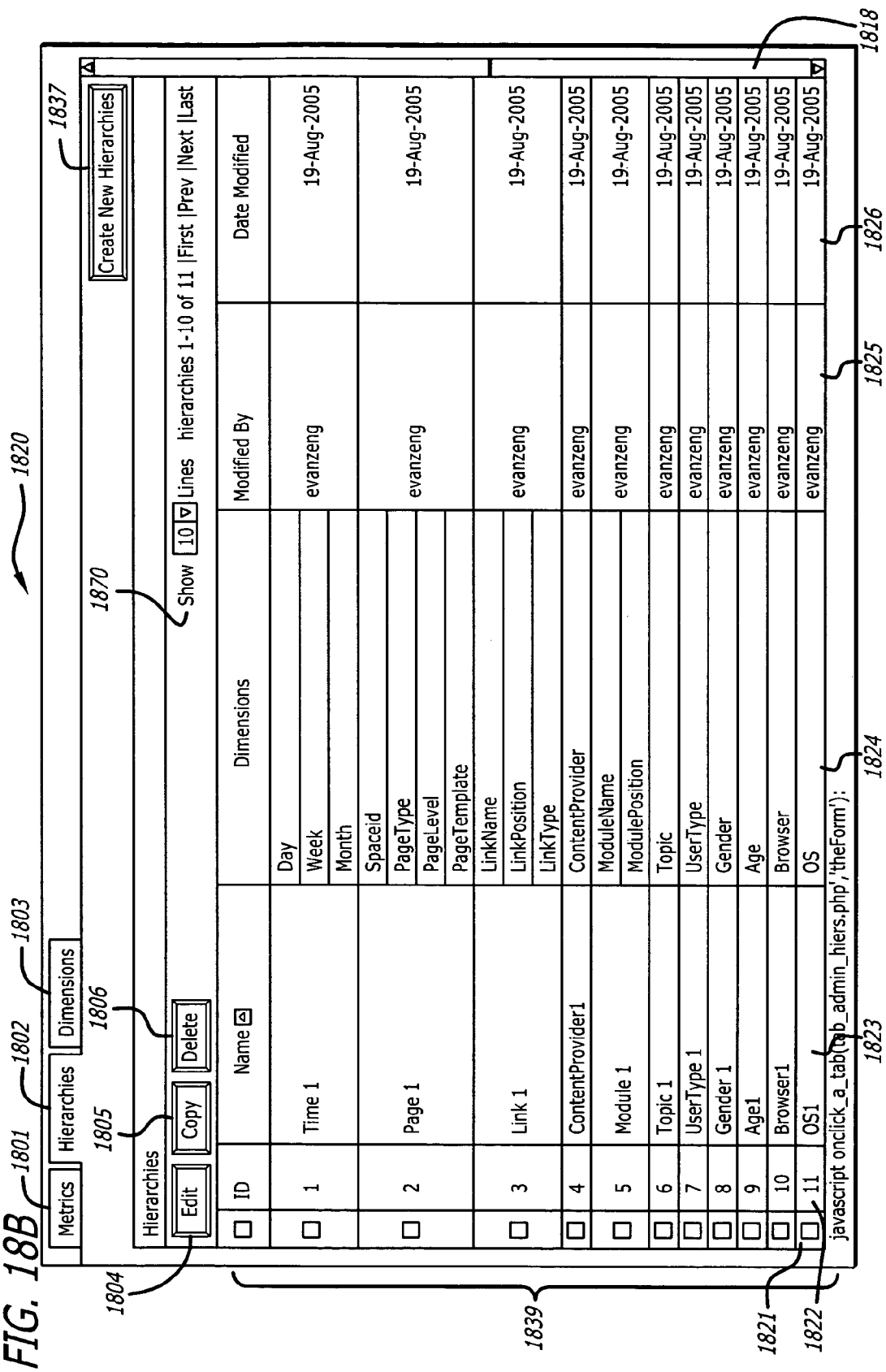
Figure 18C:
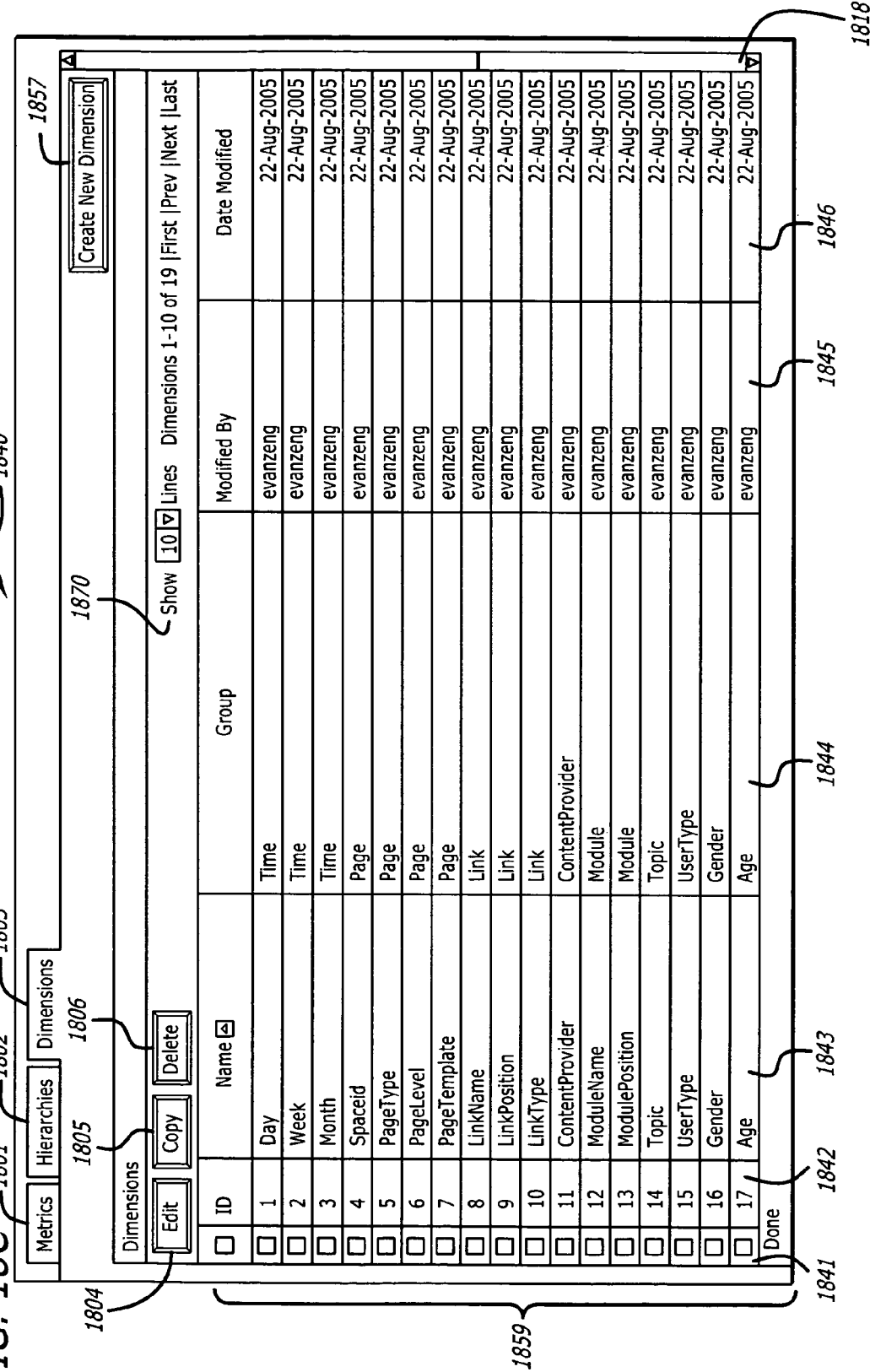
Figure 18D:
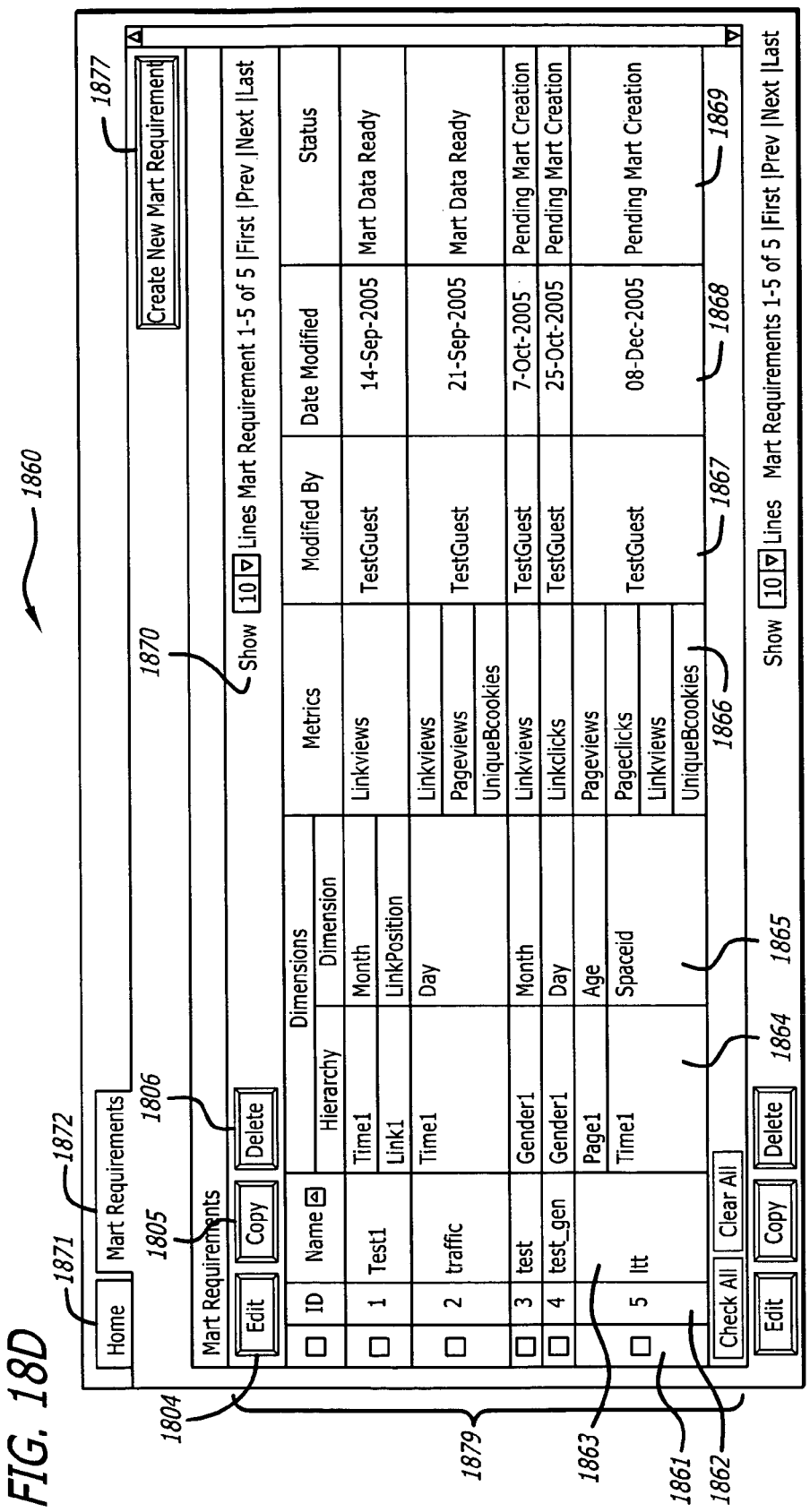

FIG. 18, which comprises FIGS. 18A to 18D, provides examples of screens used with administrative and user portals of a BISKIT system in accordance with one or more embodiments of the present disclosure.

Figure 19B:
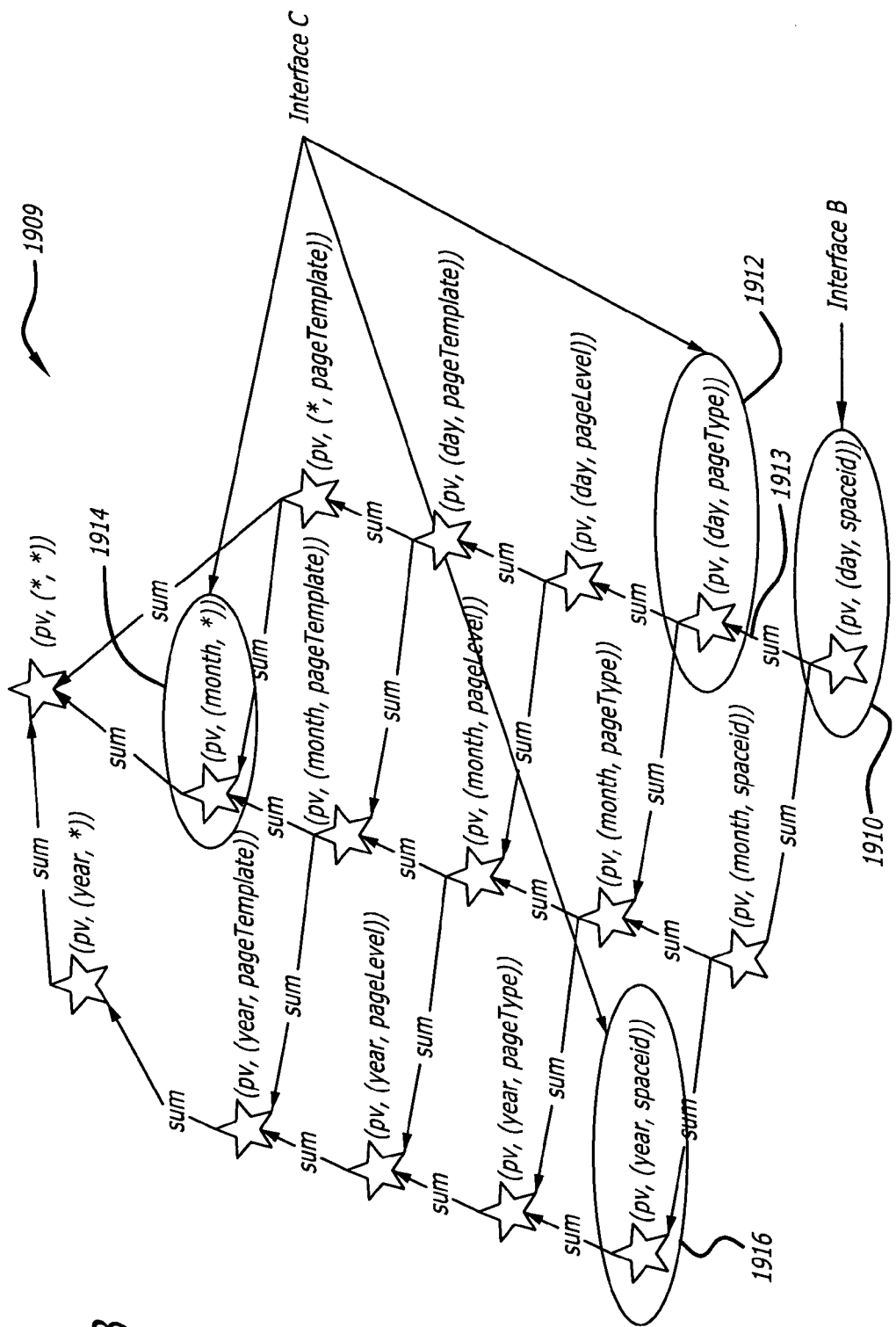

FIG. 19, which comprises FIGS. 19A to 19C, provides examples of dimensions, hierarchies, metric-stars, roll-up operations, bridge interface 112, target interface 113, a star graph, and second tier transformations of a BISKIT system in accordance with one or more embodiments of the disclosure.

DETAILED DESCRIPTION

In general, embodiments of the present disclosure comprises a logical model architecture and a system and method of building business intelligent systems using the logical model architecture.

Certain embodiments of the present disclosure will now be discussed with reference to the aforementioned figures, wherein like reference numerals refer to like components.

In accordance with one or more embodiments, a logical model is used as an underlying model of a BI system, and defines basic elements of a BI system. Each element can be defined using a mathematical, or other, expression, for example. The logical model further comprises a two-tier architecture which uses the defined elements and standard interfaces between the tiers, with entry and exit points of the tiers.

The logical model used in embodiments of the present disclosure facilitates representation of the data and processing, as well as facilitates the allocation of data and processing. In accordance with embodiments of the present disclosure, the logical model is platform independent and data source independent. Standard relational database management system (RDBMS) technologies such as relational data models and aggregations can be used. Embodiments of the present disclosure provide a mechanism for building a logical model for use with a BI system, or systems, from a generic point of view, using abstractions to describe components of a BI system (e.g., data structures/requirements, relationships and aggregation operations, data sources and intermediate structures).

Logical Model Overview

FIG. 1, which comprises FIGS. 1A and 1B, provides an overview of a logical model 100 used in accordance with one or more embodiments of the present disclosure. The example illustrates relationships between the data sets as well as the transformations.

Referring to FIG. 1A, the logical model 100 comprises four sets of data: detailed, or source, data 101, metrics with most granular dimensions 102, selected aggregated data 103 and dimensions and hierarchies 104, each of which is discussed in more detail below. A dimension represents a data item of detailed data 101, which can be used in grouping or aggregating another data item. Detailed data 101 can further comprise a measure, which represents a data item other than a dimension. As is discussed in more detail below, dimensions can be related as parent-child dimensions. In such a hierarchy, the most granular dimension is the dimension which has no child dimension. In addition and as is further discussed below, a dimension can be part of more than one dimension hierarchy, and a given dimension can be the most granular dimension in one dimension hierarchy but not in another dimension hierarchy. A dimension and dimension hierarchy can be grouped with other dimensions and/or dimensions hierarchies in a dimension group. A dimension group can be used to represent a category of information.

Referring to FIG. 1B, the logical model 100 comprises a source interface 111, bridge interface 112, and target interface 113. In one or more embodiments, first tier 115 transformations can relate "business logic" components or metrics, e.g., logical data items used by a business entity for reporting and analysis. First tier 115 transformations can be used to define a metric, and any associated dimensions and/or measures. A metric comprises a quantifiable piece of information usable by an entity/enterprise. A metric can correspond to one or more source data items. In a business enterprise, a metric can provide a measure of some aspect of the business, such as sales revenue, cost of inventory, etc. As is discussed below, dimensions can be defined to be an aggregation of one or more other dimensions. For example, a month dimension can be defined as an aggregation of a day dimension.

In accordance with one or more embodiments, dimensions can have associated key attributes, which correspond to relational keys of corresponding dimension tables in a relational database. In addition, dimensions can have display attributes, which can be displayed together with a value associated with the dimension. A display attribute can be used to display dimension details and in reports, for example. To illustrate, a department dimension can have a name attribute. In embodiments of the invention, display attributes are not used for grouping, and need not appear in the logical model 100. As with a dimension and in accordance with embodiments disclosed herein, a measure element can be used to correspond with a data object. A measure refers to numerical data captured in the detailed data. Examples of a measure include, without limitation, timestamp and dollar amount. As shown in this example, data can include a data value corresponding to a timestamp measure.

In accordance with one or more embodiments, a dimension can be related to one or more other dimensions. Relationships between dimensions can be represented as a directed graph, in which one dimension can be an ancestor or descendent of another dimension. An ancestor, or parent, dimension has one or more descendent, or child, dimensions, and a descendent dimension has one or more ancestor dimensions. A dimension that has no descendents, or children, is referred to as a "most granular" dimension. In accordance with at least one embodiment, in first tier 115 transformations, a metric can be associated with one or more most granular dimensions. Second tier 116 transformations can be used to derive a metric corresponding to data that is to be included in a data mart or data warehouse. For example, a metric can be derived using associated dimensions and one or more data aggregation operations.

The logical model 100 is further described in connection with a discussion of the terminology and definitions used in accordance with one more embodiments of the present disclosure.

In accordance with embodiments of the present disclosure, the logical model 100 is used to define one or more metrics. A metric can be associated with an item of data retrieved from a data source. Alternatively, a metric can correspond to an aggregation of data items. For purposes of illustration only, and without limitation, examples of metrics include page views, unique users, and revenue. In accordance with at least one embodiment, a derived metric can be defined in the logical model 100. For example, a derived metric such as revenue per click can be defined to be the result of a revenue metric divided by a number of clicks metric.

Dimension, Dimension Hierarchy and Dimension Group

In accordance with embodiments disclosed herein, the logical model 100 includes a dimension element, which can correspond to a data item or object. The data object can be considered to be a data item (e.g., user, day, etc.) or an attribute (e.g., gender) of a data item (e.g., user), for example. Dimensions can be grouped to form a dimension group. In addition, and as discussed above, dimensions can be related in a dimension hierarchy, which relationships can be represented using a directed graph. As is described in more detail below, a dimension can be used to define a level of detail of a reportable item. For example, an output item (also referred to herein as a metric) such as revenue can be provided by day and/or by month.

FIG. 2, which comprises FIGS. 2A to 2C, provides examples of a dimension, dimension hierarchy and dimension group in accordance with one or more embodiments of the present disclosure. Referring to FIG. 2A, four dimensions are shown: user, gender, day and month. Each of the dimensions represents a data object, and corresponds to an object of data, e.g., a piece of data received from a data source and of interest in a BI system. In addition and as discussed in more detail below, a dimension defines a level of granularity associated with a metric.

Dimensions can be related in a dimension hierarchy, as shown in FIG. 2B. A hierarchy is a linear list of dimensions related as parent and child, such that a parent dimension can have one or more children, such as in a "one-to-many" relationship. In the example time hierarchy T 210, the relationship between day and month comprises a one-to-many relationship, such that a day belongs to a month, while a month can have many days. Also shown in FIG. 2B is a user hierarchy U 200, with nodes 201 and 202 corresponding to user and gender dimensions.

In accordance with one or more embodiments, a dimension can be included in more than one hierarchy. In the example shown in FIG. 2B, the month dimension is a part of time hierarchies T 210 and T2 220, as represented by nodes 212 and 221, respectively.

Nodes 201, 211 and 221 correspond to a lowest level dimension which has no child dimensions, e.g., user, day and month, in a dimension hierarchy, each of which can be referred to as the most granular dimension in their respective dimension hierarchy. For example, the day dimension (i.e., node 211 in hierarchy 210) is the most granular dimension in time hierarchy T 210.

As is discussed below, a parent-child relationship between two dimensions can have an associated aggregation operation. For example, the aggregation operation can comprise a "roll-up" operation, such that a child can be rolled-up, or aggregated, into its parent. For example, a time hierarchy, T, 210 comprises nodes 211 to 213 representing day, month and year dimensions. The time hierarchy T 210 can be expressed as time T:=(day→month→year). If a "roll-up" operation is applied such that day is aggregated (e.g., summed) into month, time hierarchy 220, $T_2$, results. Node 221 of time hierarchy $T_2$ represents a month dimension and node 222 represents a year dimension. In time hierarchy T 210, node 212 represents the month dimension as a parent of the day dimension, represented by node 211, and the day dimension is the child of the month dimension. Another example of an aggregation operation discussed below is a "drop-down" operation.

Dimensions can be defined as being part of a dimension group. A dimension group is comprised of a set of related dimension objects. A dimension group definition can comprise the hierarchical relationships defined by a dimension hierarchy. A dimension group can be defined using a direct graph with each node of the direct graph corresponding to a dimension. The arrows, or edges, between the nodes represent a relationship between dimensions.

FIG. 2C provides examples of dimension groups in accordance with one or more embodiments. A time dimension group 260 includes day, week, month, quarter and year dimensions and a hierarchy 263 which includes two legs, or sub-hierarchies, 261 and 262. Sub-hierarchy 261 includes a day dimension as a child of a week dimension. The day dimension is also part of sub-hierarchy 262, the day dimension is a child of a month dimension, which is a child of a quarter dimension. The week and quarter dimensions are both children of a year dimension. A dimension group can be complex. A direct graph can provide a mechanism to represent a dimension group, the dimensions in a dimension group and relationships between dimensions in a dimension group.

Dimension groups 250 and 270 are also shown in FIG. 2C. Dimension group 250 includes hierarchy 200, which is also shown in FIG. 2B, of a user dimension as the child of a gender dimension. Dimension group 250 further comprises hierarchy 251. Hierarchy 251 comprises the user dimension as a child of a user interest subtype dimension, which is in turn a child of a user interest type dimension. Similarly, dimension group 270, which represents a location dimension group, includes a hierarchy 273 and two sub-hierarchies 271 and 272. Sub-hierarchy 271 includes zip and state dimensions and sub-hierarchy 272 includes a DMA (direct marketing area) dimension.

Star and Metric-Star

In accordance with one or more embodiments, a dimension group, such as the example dimension groups shown in FIG. 2C, can be represented as a star. As is described in more detail below, by associating a star with a metric, a metric can be defined as capable of being grouped by, or computed on, a dimension identified by a star. For example, if a metric is associated with the star representing dimension group 250 of FIG. 2C, the metric can be grouped by one or more of the dimensions in dimension group 250, i.e., user, gender, user interest subtype and user interest type dimensions. In addition and in accordance with embodiments presently disclosed, the granularity associated with a dimension identified by a star can identify the granularity of a metric associated with the star.

FIG. 3 provides examples of stars and associated dimensions in accordance with one or more embodiments of the invention. Each of stars 300, 310, 320 and 330 comprise a set of dimensions. A star can be expressed as a tuple. More particularly, star 310 can be expressed as Star 2=(user, day, zip). In the example of 310, data is available at the level of the user, day and zip dimensions. Another way to express this is that star 310 groups data by user, day and zip.

In accordance with embodiments of the disclosed invention, all possible combinations of dimensions can be used to define a star. In the example shown in FIG. 3, star 310 and star 320 are equivalent from a granularity point of view, because the month can be inferred from a day using the time hierarchy T, e.g., hierarchy 210 of FIG. 2B. That is, the month dimension in star 320 does not add new information to star 320, since data associated with the month dimension can be computed using the day dimension.

However, star 320 is not necessarily equivalent to star 330. More particularly and with reference to FIG. 2C, the zip and DMA dimensions belong to different dimension hierarchies, as illustrated by sub-hierarchies 271 and 272. Although they belong to the same dimension group, a zip code is not derivable from a DMA code, or vice versa.

In accordance with at least one embodiment, a metric can be related to a star, such that the metric is associated with a set of dimensions represented by the star. A metric-star can be represented as (METRIC, STAR). Examples of such an expression are be provided with reference to FIG. 4, which provides example of metrics and associated stars in accordance with one or more embodiments of the present disclosure.

FIG. 4 provides examples of metrics and associated stars in accordance with one or more embodiments. For example, three metric-stars 400, 410 and 420 are shown in FIG. 4. Metric-stars 400 and 410 associate a page views metric 401 with star 300, in the case of metric-star 400, and star 310, in the case of metric-star 410. Using metric-star 400, a page view metric can be grouped by user and by day. Metric-star 420 associates a unique users metric 421 with star 310. Metric-star 400, which can be expressed as MetricStar 1=(page views, (user, day)), indicates that the page views metric 401 can be grouped by the user and day dimensions. Metric-star 410, which can be expressed as MetricStar 2=(page views, (user, day, zip)), indicates that page views metric 401 can be grouped by the user, day and zip dimensions. Metric-star 420, which can be expressed as MetricStar 3=(unique users, (user, day, zip)), indicates that a unique users metric 421 can be grouped by the user, day and zip dimensions.

Logical Model Interface

Referring again to FIG. 1 and in accordance with one or more embodiments of the present disclosure, the logical model 100 includes three interfaces: a source interface 111, a bridge interface 112, and a target interface 113, each of which are discussed below.

In accordance with at least one embodiment, data is represented as a set of records, with each record containing fields. Each of the fields corresponds to a dimension or a measure.

Each record can include a virtual measure, occurrence (occr), for each source data record, with the value of the measure being one for each record.

In accordance with embodiments of the disclosure, source interface 111 of the logical model 100 represents the data, and maps each field to a dimension or a measure. For example, a schema can be expressed as [DIM1, DIM2, . . . , DIMn, MS1, MS2, . . . , MSm, occr], where DIMx corresponds to a dimension and MSx corresponds to a measure. For example, a schema such as the following:

---
[page_id, user, day, timestamp, dollar, occr]
--- can represent the following data:

---
(111000, joe123, 01/01/05, Jan. 1, 2005 5:00pst, $10, 1)
(111001, jan123, 01/02/05, Jan. 2, 2005 1:23pst, $20, 1)
(111004, joe123, 01/01/05, Jan. 1, 2005 5:01pst, $2, 1)
---

Each of the first five fields corresponds to a dimension and the last field corresponds to a measure. One or more layers of pre-processing (e.g., a view or other processing) can be used to transform the data into a set of records with each record having a set of fields. In addition or as an alternative to pre-processing the data, a unique identifier can be added to the data such that the combination of the unique identifier and the dimension identifier can be used as a key for use with the source data.

In accordance with one or more embodiments, the bridge interface 112 relates a metric and a star. In accordance with at least one embodiment, the bridge interface 112 contains a set of metric-stars, one for each metric. Since a star comprises a set of dimensions in one or more embodiments, each metric-star relates a metric to the set of dimensions. In at least one embodiment, each related dimension is a most granular, or the most detailed, dimension, so as to define the most detailed dimension(s) on which the metric can be computed. To illustrate, assume that applicable dimension hierarchies of metric M are H1, H2, . . . Hn and that a most granular dimension of each hierarchy is D1, D2, . . . Dn, a metric-star (M, (D1, D2, . . . , Dn)) can be defined by bridge interface 112.

FIG. 5 illustrates a collection of metric-stars in a bridge interface 112 in accordance with embodiments of the present disclosure. Metric-stars 410 and 420, which were described with reference to FIG. 4, are included in the bridge interface 112. Metric-star 500 associates refund metric 501 with star 502, which identifies user and month dimensions. Referring to FIG. 2B, the month dimension is not the most granular dimension in the time hierarchy T 210. However, the month dimension is defined in time hierarchy T2 220 of FIG. 2B to be a most granular dimension. Assuming a time hierarchy T2 220, month is a most granular dimension, and the user dimension is the most granular dimension of user hierarchy, U, 200.

Using the tuple expression syntax described above, the metric-star 500 shown in FIG. 5 can be expressed as metric-star 5=((refund, (user, month)). Metric-stars 410 and 420 correspond to metric-star 2 and metric-star 3 discussed herein.

In one or more embodiments, the bridge interface 112 can be virtual, such that some or all of the data represented in bridge interface 112 need not be stored in a data warehouse/mart. In so doing, it is possible to limit, or reduce, the volume of data that is stored, which volume would otherwise be quite large. Accordingly, the data identified in the bridge interface 112 can be stored on an as needed basis in order to reduce the data storage needed, and can be further refined using another interface, a target interface 113.

Referring again to FIG. 1B, target interface 113 is generated using second tier 116 transformations on bridge interface 112. The target interface 113 contains a set of metric-stars derived from bridge interface 112, which can be used to represent the selected data models for reporting and/or analysis tools, e.g., an OLAP analysis tool. The target interface 113 can define the data that is to be stored in a data repository, e.g., an RDBMS. In target interface 113, there can be more than one metric-star for each metric. FIG. 6 provides an example of target interface 113 comprising a collection of metric-stars in accordance with embodiments of the invention.

In the target interface 113, a metric-star need not involve the most granular dimensions. In addition, metric-stars 600, 610, 620 and 630 represent the data to be stored in the data repository for use by reporting and analysis tools. More particularly and in accordance with the metric-stars defined in the example of a target interface 113 shown in FIG. 6, a data repository can be used to store data to output refunds grouped by user, month and year, page views grouped by user, day and zip, and unique users grouped by day.

Logical Model Transformation

In accordance with at least one embodiment of the present disclosure, at least first and second tier 116 transformations are used by the logical model 100. A first tier 115 can comprise mapping transformations to map components of the source interface 111, e.g., dimensions and measures, to other components of the source interface 111, as well as metric-stars identified by the bridge interface 112.

To illustrate, a metric can be mapped to a measure or a dimension, and a dimension can be mapped to another dimension identified by the source interface 111. The following provides examples of expression formats that can be used to express these mappings in accordance with one or more embodiments:

---
Metric = map Measure
Metric = map Dimension
Dimension = map Dimension
---

The following provides examples which use the above expression formats:

---
page views = map occurrence
dollar amount = map dollar
unique users = map user_id
---

In one or more embodiments, in the first tier 115, a metric is computed from a single data field defined by the source interface 111. A metric computed using more than one field can be computed as a derived metric in the data flow.

As an optimization, in accordance with embodiments of the invention, a filter can be defined as part of the mapping. Filters can be used to reduce data volume. The following provide examples of a mapping using a filter, assuming that in the data, there is a record_type with values p (for page) and l (for link):

```
page views = map occurrence if record_type = p
link view = map occurrence if record_type = l
```

In accordance with embodiments of the invention, the first tier 115 can comprise a transformation used to define a business concept, or information item identified for analysis. The business concept need not exist in the data. For example, a session, funnel or segment represents business concepts, which do not exist in the data. In the logical model architecture, these concepts can be represented as a derived dimension in bridge interface 112.

For example, a session can be defined as a user visit event to one or more web pages, where each interval between two consecutive events is less than ten minutes. This concept can be captured using a data processing module. In bridge interface 112, session is defined to be a derived dimension, such that metrics such as the total page views and total time spent for a session can be computed using the derived dimension.

In accordance with embodiments of the invention, in the bridge interface 112, like other dimensions, derived dimensions can be associated with one or more metrics. For example, a timespent metric can be computed on session, location and day, or (timespent, (session, location, day)), such that the timespent metric is available by session, location and day. Thus, derived dimensions can be used much the same as other dimensions.

A second tier 116 transformations are used to determine the contents of a data repository, which contents can include measures, metrics and dimensions, for example. The metrics and dimensions can be determined from metric-stars defined in bridge interface 112, as well as other metric-stars (some newly created as discussed herein). The second tier 116 transformation can be used to generate data models to host data. In accordance with at least one embodiment of the invention, a star graph can be used to represent/determine second tier 116 transformations.

Star Graph and Aggregation

In at least one embodiment, a star graph defines a collection of stars. In one or more embodiments of the invention, a star graph can be created, e.g., algorithmically, for any combination of hierarchies. Each node in the star graph corresponds to a star, which is associated with one or more dimension hierarchies. Lines, or edges, and arrows between the star nodes represent a derivable relationship between the star nodes. Thus, a star graph can be used to represent relationships between stars. One example of a relationship is a parent-child relationship.

In accordance with embodiments of the present disclosure, a complete star graph refers to a star graph that comprises all possible star nodes for a collection of hierarchies, together with all possible relationships. A base star of the complete star graph for hierarchies (H1, H2, ..., Hn) is (h1, h2, ..., hn) where h1, h2, ..., hn are the most granular dimensions of H1 to Hn.

FIG. 8 provides an illustrative representation of a star graph using hierarchies H1=(user), H2=(zip), H3=(day) in accordance with at least one embodiment of the invention. The star graph includes stars 801 to 808. Star 801 is the most granular of the stars, such that it can be grouped using the user, zip and day dimensions. Star 801 is a child of stars 802 to 804, since one of the user, zip and day dimensions is dropped in stars 802 to 804, respectively. Star 808 is the parent of each of stars 801 to 807 via a drop operation, which results in a grouping using all three of the user, zip and day dimensions.

As is illustrated in FIG. 8, a star can be a parent of another star. In accordance with one or more embodiments, a star is the parent of another star if the parent star can be "obtained from" the child star via a "drop" or "roll-up" operation. A drop operation drops the hierarchy, which is similar to a "group by all" for a given hierarchy. In other words, for example, all of the dimensions in a hierarchy are used to "group by" rather than using each individual dimension to "group by". A roll-up operation results in a child dimension being grouped with its parent dimension, as defined in a dimension hierarchy.

In accordance with one or more embodiments, a roll-up operation can be defined for a given metric along a star hierarchy from a child star to its parent star. Roll-ups can be considered to be sub-graphs of star graphs. A roll-up operation can be used to identify the data that is needed for the target interface 113. For example and in a case that a roll-up operation can be performed for a metric, such that the data corresponding to the metric and/or data used to compute the metric can be stored at the level of aggregation associated with a parent dimension can be stored rather than the data associated with a child dimension.

FIG. 7, which comprises FIGS. 7A and 7B, provides examples of star hierarchies in accordance with at least one embodiment of the disclosure. In the example shown, star (user, day) 300 is a parent of star(user, day, zip) 310, since star 300 can be obtained by dropping the location hierarchy from star 310. To further illustrate, star(user, month) 700 can be a parent of star(user, day) 300 using a roll-up operation to replace day with its parent month in the time hierarchy. A roll-up operation involving a metric and dimension hierarchy can be represented as (M, H, Func) where M is a metric, H is a hierarchy, and Func is an aggregation function.

FIG. 7B provides examples of drop and roll-up operations represented in a star graph in accordance with one or more embodiments of the present disclosure. The definition of a hierarchy can include "all" as the parent of the least granular dimension. For example, the star hierarchy comprising stars 300 and 310 in FIG. 7A can be said to be equivalent to the star hierarchy comprising stars 710 and 720 of FIG. 7B.

To further illustrate, hierarchy H=(day→month) becomes H'=(day→month→*) where "*" means all (e.g., as is used in the structure query language, SQL, notation). This notation, star(user, link, *), can be used to designate a "group by" operation, i.e., to mean group by user and link. In addition and by changing the definition of the hierarchy, the "drop of a hierarchy" can be modeled as a roll-up action to the dimension "all".

FIG. 9 provides additional examples of a roll-up relationship between stars in a star graph in accordance with one or more embodiments of the invention. More particularly, the star graph is similar to the star graph shown in FIG. 8, with the exception of stars 901 to 904, which represent the result of a roll-up operation. More particularly, star 901 is a parent of star 801 by virtue of a roll-up operation performed on the day dimension to yield the month dimension. Similarly, stars 902, 903 and 904 are parents of stars 803, 804 and 806, respectively, as a result of a roll-up operation from the day dimension to the month dimension.

In accordance with one or more embodiments, there are at least four scenarios for applying a roll-up operation to a given metric along a hierarchy. FIG. 11 provides examples of a roll-up operation by metric and hierarchy in accordance with one or more embodiments of the present disclosure.

In one scenario, all of the dimensions in a hierarchy can be "rolled-up" using the same function. In other words, a roll-up operation is allowed along all dimensions in a hierarchy, using the same aggregation function(s), to yield a given metric. Referring to metric-star hierarchy 1100, a page view metric is associated with a star identifying the user, time and location dimension hierarchies. In the example shown in FIG. 11 using star hierarchy 1100, a page view metric can be aggregated using a sum function to roll-up along the time dimension hierarchy. A roll-up operation can be expressed as (Metric, Hierarchy, Function), or (page view, time, sum). In this example, the sum function is used to roll-up the time dimension hierarchy (i.e., day→month→year→all), such that page views can be grouped by day, month (i.e., by summing the daily page view totals), year (i.e., by summing the monthly page view totals), and all (i.e., by summing the yearly page view totals).

Star hierarchy 1110 illustrates a roll-up along the user and location dimension hierarchies. More particularly, the page views metric is summed along stars 1111 to 1114 and the location dimension, and the page views metric is summed along stars 1115 to 1118 and the user and location dimensions. Star 1119 represents a roll-up of the user and location dimensions, such that star 1119 corresponds to a page views metric that represents a daily page view total for all users and locations.

Alternatively and while a roll-up operation can be applied to all of the hierarchies, a different function can be used to perform the operation. In other words, a first function can be used to roll-up from the most granular dimension to its parent, and then a different function is used to roll-up from the parent to the most granular dimension's grandparent. In accordance with one or more embodiments, an order of the dimensions in a hierarchy can be used to identify how the metric is to be computed.

Under an alternate approach, no roll-up is allowed along any hierarchy using any function. In this case, the roll-up function is assumed to be none. In such a case, for example, a detailed data item identified in the source interface 111 cannot be aggregated, and the target interface 113 can indicate that the detailed data is to be stored in a data repository.

Under yet another approach, a partial roll-up can be allowed, e.g., a roll-up is allowed along some hierarchies but not others. However, there is at least one hierarchy with which a metric cannot be rolled-up. For a hierarchy with which a metric cannot be rolled-up, the aggregation function can be designated as none, and the data is preserved along this hierarchy in order to compute the metric.

Event

In accordance with embodiments of the disclosure, a star graph can be "trimmed" (or optimized) so as to comprise less than a complete star graph. For example, dimensions can be grouped by "events", as a mechanism to trim the star graph. An event can be an activity, the occurrence of which can be measured, for example. Examples of an event include, a user viewing a web page, a user clicking a link within a page, a person making a purchase, etc. An event can be represented in logical model 100 as a metric.

An event can defined by a metric, which has associated dimensions. By specifying certain event metrics to be used to generate a star graph, it is possible to limit the star graph to include those dimensions associated with a specified metric. For example, assume there are two events in which an entity is interested, e.g., purchases and web page views. The first event is represented by a purchases metric, which is associated with dimension hierarchies H1=(user), H2=(zip), H3=(day), and the second event is represented by a page views metric, which is associated with dimension hierarchies H3=(day), H4=(page), H5=(IP). The two events share dimension hierarchy H3.

FIG. 10 provides an example of a trimmed, or optimized, star graph in accordance with one or more embodiments of the invention. The star graph includes stars 801 to 808 of FIG. 8, which are related to the purchasing event, which is represented by a metric (e.g., a purchases metric) which can be grouped by the user, zip and day dimensions. In addition, FIG. 10 includes stars 1001 to 1006, which are related to the page viewing event, which is represented by a metric (e.g., a page views metric) which can be grouped by the day, page and IP dimension hierarchies. The two star graphs, i.e., the graph of stars 801 to 808 and the graph of stars 1001 to 1006, share the day dimension, as shown in the star graph of FIG. 10. However, since the two events do not share the user, zip, page and IP dimensions, the star graph can be optimized by trimming the dimension combinations from the star graph.

Requirement

In one or more embodiments, a requirement can be a reporting and/or analysis requirement, e.g., a requirement can be used to identify the data needed to satisfy a reporting and/or analysis need. In the logical model, requirements are represented as a set of metrics-stars. In accordance with at least one embodiment, a target interface 113 is determined based on specified requirements, and is determined so as to support each of the specified requirements. In accordance with one or more embodiments, the target interface 113 can further be determined based on optimization criteria such as response time and space utilization.

FIG. 12 provides an example of a set of requirements in accordance with at least one embodiment of the invention. Among the examples shown, is a requirement for a refund metric grouped by user and grouped by month. In another example of a requirement, the refund metric is to be grouped by user and year. In yet another example, there is a requirement for a page views metric to be grouped by day and zip. As another example, a unique users metric is to be grouped by day.

FIG. 13 provides an example of a star graph illustrating levels of detail and aggregation for use in determining data components of a target interface based on identified requirements in accordance with one or more embodiments of the disclosure. The example includes a region 1301 which includes stars at various levels of aggregation. The example assumes a requirement for a metric to be grouped by month, day, and zip separately. Based on the requirement, the target interface 113 can indicate that the data corresponding to the metric is to be included in a data repository at a level of detail such that the metric can be computed by month, day and zip, such as is shown in region 1301 of the star graph. Alternatively, target interface 113 can indicate that data repository is to store the data corresponding to the metric at the level specified in region 1302. The latter case, in which the daily metric data is aggregated to yield the monthly metric data might be selected in order to reduce the space requirements for storing the data repository, for example. In the latter case, target interface 113 can identify that data corresponding to the metric is to be stored in the data repository at the day and zip level, and that the requirement for the monthly metric data can be satisfied using an aggregation operation, to compute the monthly metric using the daily metric data. As can be seen in the star graph shown in FIG. 13, i.e., the day dimension is a child of the month dimension, and can be rolled-up into the month dimension.

In accordance with one or more embodiments, target interface 113 identifies the contents of the data repository. Reporting and analysis tools can use the data stored in the data repository using the target interface 113. In addition, such a tool can be used to derive a metric. In accordance with one or more embodiments, a reporting and/or analytical tool can be an "off-the-shelf" tool, or it can be a customized reporting and/or analytical tool. Embodiments disclosed herein provide the data sufficient to support such tools.

In some cases, detailed data (e.g., data supplied by another party) might not be available; however, a metric might be available at an aggregated level. In accordance with at least one embodiment, the metric data can enter the system at the bridge interface 112 level, without first tier 115 transformation. To illustrate, assume that an external data processing system generates an aggregate page views data value, which is aggregated by country and day. Metric-star interface 112 can comprise a page views metric and a pageviews, (country, day)) metric-star.

In general, data availability can be represented using a metric-star construct. In so doing, it is possible for other systems to plug their data in at any level. However, without data in the source interface 111, it might not be possible to compute metrics at an arbitrary level in the star graph in a case that the metric is incapable of being aggregated.

Embodiments of the present disclosure provide a logical model 100 for a business intelligent system, and provide the building blocks on which a BI system can be built. Target interface 113 can be defined to take advantage of various optimizations, when defining/building a BI system. As discussed above, examples optimization involve a determination of which metric-stars to store in a data depository, and what level of data aggregation is used for the data in the data repository. In addition, logical model 100 can be defined to span multiple entities within a business enterprise. In such a case, the logical model 100 can defined for use with all of the entities, which can result in shared metrics and aggregation operations as well as optimal levels of data aggregation based on the combined requirements of the multiple entities. In addition, a logical model 100 which combines the requirements of multiple entities of a business enterprise can result in a target interface 113 which can be used to optimize the population of the data repository, such that the data repository includes the data indicated by each entity's requirements, as well as an optimal level of data aggregation. The extract, transform and load (ETL) operation(s) used to populate the data repository based on target interface 113 can be optimized, so as to build a data repository that takes into account each entity's requirements, and any shared requirements.

Implementation Example

The following provides an example of an application, referred to as BISKIT, which uses a logical model architecture in accordance with embodiments of the present disclosure. In the BISKIT example, data is collected from data web logs and is stored in a storage layer. The source provides an SQL interface to access the data. It should be apparent that the example implementation described herein is one example of an implementation using one or more embodiments of the present disclosure, and that the example implementation is not intended to in any way limit the scope of the embodiments disclosed herein.

FIG. 14 provides an example of an architecture for use in the BISKIT example in accordance with one or more embodiments of the present disclosure. The BISKIT architecture 1400 comprises a user interface 1401, a metadata repository 1402, an engine 1403, a database server 1404 and source data 1405.

In accordance with at least one embodiment, in the BISKIT system, metadata is used as an interface between the components of the architecture 1400, and is used to specify information concerning dimensions and hierarchies, for example. The metadata is used to manage inputs and outputs to and from different components. The BISKIT system runs in two phases, the definition phase and the processing phase. During the definition phase, the system collects requirements as well as source availability, and creates one or more data models plus ETL scripts. A data mart is comprised of the data model(s) and scripts. In the processing phase, data is loaded in the data mart(s), and the data collected in the data mart(s) can be used to create reports, to satisfy specified requirements.

In more detail and in the definition phase, metrics available at the bridge interface 112 are defined, and a mapping is defined to identify the different data sources to supply the corresponding data. A set of requirements are collected and stored in metadata repository 1402. Database server 1404 generates a database schema and creates a database, or other data repository, based on an optimization algorithm and a cost model. Metadata is used to define the transformations and aggregations associated with the schema, bridge interface 112 and target interface 113.

The processing phase performs the ETL from the source interface 111 to the target interface 113. Job scheduling, surrogate key management, recovery, data validation, monitoring, etc. can also be addressed.

In the BISKIT example, one universal table MAIN_FACT is used as data source 1405, with each row in the table representing an event that happened on a web site's web page. FIG. 15 provides an example of a universal table 1500 of a data source for use with a BISKIT system in accordance with one or more embodiments of the present disclosure.

The MAIN_FACT table 1500 includes a FACT_ID field as a surrogate key assigned to each row in the table, BUSINESS_UNIT_ID as the business unit that receives an event, DATE as a date of the event, USER_USER_ID as information identifying a user who performed the event, USER_GENDER as the gender of the user who performed the event, EVENT as the type of the event, which can be of type click (i.e., which represents clicking on a link) and of type view (i.e., for viewing a web page).

The metadata 1402 contains data structures for storing the metadata, and an application programming interface, API, for accessing and updating the metadata layer. In this example, the metadata layer is a nucleus of the BISKIT system and enables the system to be modular and configurable. Metadata 1402 provides a description of the BISKIT system. As a result, templates of common metrics, dimensions and requirements can be stored and re-used. In the BISKIT example, there are four different types of data stored in the metadata 1402. FIG. 16 provides an example of metadata components and application programming interfaces of the BISKIT system in accordance with one or more embodiments of the present disclosure.

The system metadata 1601 includes information concerning the BISKIT system's state and available resources. Such information includes information to access different system components, information regarding available data sources and corresponding access information (e.g., drivers, authentication information, such as user names and passwords), roll-up operations, transformations, etc. In addition, the system metadata includes mapping functions which are implemented by the BISKIT system, and which are available to be used for mapping and transforming data in the first tier 115 transformations and second tier 116 transformations.

The source definition 1602 includes data definitions of the source interface 111. The source definition 1602 further includes metrics and dimensions of the bridge interface 112, and mapping and transformation functions used to generate derived metrics and dimensions from data sources, e.g., first tier 115 transformations from data of the source interface 111 to metric-stars of the bridge interface 112. The source definition 1602 further includes information concerning available dimension groups, hierarchies, stars and metrics-stars.

The mart metadata 1603 contains data mart instance specifications, such as requirements (metric-stars) needed to answer business questions, target interface 113 definitions (i.e., which can include one or more chosen metric-stars), and configuration and loading metadata generated by definition modules used to transform and load data from source interface 111 to target interface 113.

Operational metadata 1604 includes information such as information concerning data loading dependency and frequency, and escalation contacts for a monitor system.

FIG. 17 provides an example of metadata used in the BISKIT system in accordance with one or more embodiments of the present disclosure. The metadata is written using an extensible markup language, or XML, syntax. For the sake of simplicity, in the BISKIT system, all of the metadata can be stored in one file, e.g., an XML file.

The BISKIT system includes a user interface module 1401, which provides access to the metadata layer using the metadata APIs. The user interface module 1401 can be used to configure the system, for example. In accordance with at least one embodiment, the user interface is built using a personal hypertext preprocessor, PHP, tool, which includes a scripted programming language, and is hosted on a shared machine, e.g., an Apache server. In accordance with at least one embodiment, user interface 1401 has two portals: an administrative, or admin, portal and a user portal.

The admin portal is used to configure and update the system metadata as well as the source definition metadata. It enables an administrator to add and/or update existing metrics and dimensions and define corresponding mapping and transformation functions to operate on the data, such as the data defined using source interface 111, for example. The admin port further includes security and access control.

FIG. 18, which comprises FIGS. 18A to 18D, provides examples of screens used with administrative and user portals of a BISKIT system in accordance with one or more embodiments of the present disclosure.

Referring to FIG. 18A, screen 1800 includes three tabs 1801 to 1803, which are labeled Metrics, Hierarchies and Dimensions, respectively. Tabs 1801 to 1803 can be selected to move to other screens of the admin portal. Screen 1800 can be reached by selecting the Metrics tab 1801, for example. Screen 1800 can be used to edit, copy, delete and create metrics. More particularly, boxes 1804 to 1806 and 1817 allow the user to edit, copy, delete and create a metric, respectively. Screen 1800 includes columns 1807 to 1816, each of which is associated with a metric displayed in a row in section 1819 of screen 1800. Column 1807 can be used to select one or more metrics. Columns 1808 to 1813 display identifier, name, aggregate function, data source identification, field, and filter function information. Column 1814 identifies the hierarchies in which the metric can be used/defined. In accordance with one or more embodiments, the information supplied in column 1814 together with a corresponding metric identified in column 1809 is be used to define one or more metric-stars. Columns 1815 and 1816 provide information for identifying when a metric was modified and by whom. Scroll bar 1818 provides the ability to scroll through the metrics, and to view information corresponding to a metric. In addition, 1870 provides an ability to specify the number of lines shown/displayed per page, identifies the current items (e.g., hierarchies) being displayed, and provides an ability to navigate between pages (e.g., first, previous, next, last pages).

Referring to FIG. 18B, a hierarchies screen 1820, which is reachable by selecting the Hierarchies tab 1802, provides an ability to view information associated with a hierarchy. Selection boxes 1804 to 1806 correspond to edit, copy and delete operations, respectively. Box 1837 can be selected to create a new hierarchy. Each of the rows shown in section 1839 of screen 1820 displays information, in columns 1821 to 1826, corresponding to a hierarchy. Column 1821 includes selection boxes which allow a user to select one or more hierarchies. Columns 1822, 1823 and 1824 display a unique identifier, name, and one or more associated dimensions for a given hierarchy, respectively. Columns 1825 and 1826 display modification information, as discussed above with respect to columns 1815 and 1816.

FIG. 18C provides an example of a dimensions screen 1840, which can be displayed in response to selection of the Dimensions tab 1803. The user can invoke an edit, copy or delete operation using selection boxes 1804 to 1806, respectively. Each of rows 1859 displays information, in columns 1841 to 1846, which corresponds to a dimension. Column 1841 allows a user to select one or more hierarchies. Columns 1842, 1843 and 1844 display a unique identifier, name, and associated group information for a given dimension. Columns 1845 and 1846 display modification information, as discussed above with respect to columns 1815 and 1816.

The user portal allows users to select requirements from predefined metrics and dimensions of the BISKIT system, as well as hierarchies and granularity. It stores the requirements collected from users in the metadata repository using the access APIs.

FIG. 18D provides a screen-shot of a user portal of the BISKIT system in accordance with one or more embodiments of the present disclosure. The user can access screen 1860 of the user portal via Mart Requirements tab 1872. The user can exit the screen using the Home tab 1871. Selection boxes 1804 to 1806 allow the user to invoke edit, copy and delete operations, respectively. The user can create a new mart requirement by selecting box 1877, which results in an invocation of a dimension create operation. Columns 1861 to 1869 display information for each of the mart requirements displayed in one of rows 1879. Although not shown, a scrolling capability can be used to allow the user to scroll through, and to view information associated with, mart requirements. Column 1861 allows the user to select one or more requirements. Columns 1862 and 1863 provide identification and name information. In accordance with one or more embodiments of the present disclosure, identification and name information is unique for a given requirement. Columns 1864 to 1866 identify the dimension hierarchy(ies), dimension(s) and metric(s) defined based on mart requirements. Columns 1867 and 1868 display modification information. Column 1869 identifies a status of the mart.

In accordance with one or more embodiments of the present disclosure, the BISKIT engine takes one or more requirements as an input and generates a database schema, e.g., data definition language (or DDL) specifications, for use with target interface 113. In addition and in accordance with one or more embodiments, the BISKIT engine creates configuration files for the first tier 115 transformations and second tier 116 transformations. In accordance with at least one embodiment, in the BISKIT system, the engine module also performs one or more ETL tasks.

To generate DDLs for a database schema, the engine can use a cost model and an optimization algorithm to identify the data that is to be stored, e.g.; in a data mart/warehouse, and the data that is to be derived from the stored data. In accordance with one or more embodiments, the cost model and the optimization algorithms can be independent of the logical model used to define/build the BISKIT system. By virtue of this arrangement, such cost model and optimization algorithms can be modified or replaced at anytime without affecting other components of the system. In accordance with one or more embodiments, in the BISKIT system, the optimization is such that each metric-star corresponds to a table in the database, e.g., a relational database management system (RDBMS).

Once the DDLs are created, the BISKIT engine can run one or more scripts against the relational database hosting the mart, using the access information stored in the metadata.

In accordance with at least one embodiment, in the BISKIT system, the engine module is built using a scripting language, such as the PERL scripting language. The engine can be invoked from a user interface, such as that shown in FIG. 18. As mentioned earlier, the BISKIT engine generates a data model using a separate database table for each requirement. The following provides pseudo code for use in creating a table for each requirement.

```
FOR EACH REQUIREMENT r
    CREATE TABLE r.name
    (
        {r.dimensions},
        {r.metrics}
    )
LOOP
```

In the example code above, a loop is used to loop through each requirement, r, to create a requirements table, which comprises columns for dimensions and metrics. In accordance with at least one embodiment, in the BISKIT system, the ETL code makes an assumption that the data source provides an SQL interface and a requirement is stored in a single table. Of course, it should be apparent that this is merely one example of ETL code, and other ETL code can be used in accordance with one or more embodiments. The following provides an example of pseudo code used to load the data:

```
FOR EACH TABLE t
    INSERT INTO FACT_TABLE
    SELECT {AGG_FUN1(METRIC1), ..., AGG_FUNn (METRICn)},
        {DIM1, ..., DIMm}
    FROM MAIN_FACT
    GROUP BY {DIM1, ..., DIMm}
LOOP
```

In the example code above, data is inserted into a FACT table from a MAIN_FACT table. A select statement selects data corresponding to given metrics. Each of AGG_FUN1 to AGG_FUNn corresponds to an aggregation operation that can be applied to data to derive data corresponding to a metric (i.e., to derive data for an aggregate metric), such as METRIC1 to METRICn. Data is aggregated based on the dimensions, i.e., DIM1 to DIMn, identified in the GROUP BY element.

The following provides an example of second tier 116 transformations used in the BISKIT system. As discussed above, dimensions (e.g., week, month, spaceid, etc.) can be defined using a dimensions screen such as dimensions screen 1840 shown in FIG. 18C. In addition, hierarchies can be defined using a hierarchies user interface screen such as that shown in FIG. 18B. A hierarchy can be comprised of an ordered list of dimensions. In FIG. 18C, dimension hierarchies such as Time1 and Page1 are displayed in hierarchies screen 1820, which can be represented as:

```
Time1:=(day ->month ->year), and
Page1:=(spaceid->pageType->pageLevel->pageTemplate).
```

Hierarchies can also be represented, in a relational manner, as tables, as follows:

```
Table_Time1(day, month, year), and
Table_Page1(spaceid, pageType, pageLevel, pageTemplate).
```

Using the admin portal, a user can define metrics as well as corresponding hierarchies of bridge interface 112, which can be comprised of a set of metric-stars, where each metric is combined with the most granular dimension in each associated hierarchy. Using the page views metric shown in the metrics screen 1800 of FIG. 18A as an example, applicable hierarchies include Time1 and Page1. Based on this definition, a metric-star of bridge interface 112 can be expressed as (page views, (day, spaceid)), where day and spaceid are the most granular dimensions of the Time1 and Page1 hierarchies. In addition, this metric-star can be represented as a relational table as Table_Metric(page views, day, spaceid), for example, which table comprises a column for each of page views, day and spaceid.

Referring to FIG. 18A, column 1810 of metrics screen 1800 displays an aggregate, or roll-up function. As discussed herein a roll-up function, which can be expressed as (metric, hierarchy, rollup function), is used to aggregate a metric value by rolling one or more lower-level dimensions into a higher dimension. Using the page views metric shown in metrics screen 1800 as an example, roll-ups (page views, Time1, sum), (page views, Page1, sum) define roll-up operations for a page views metric using the dimensions of the Time1 and Page1 dimension hierarchies.

The target interface 113 can be used to define a schema for data stored (or to be stored) in a data repository to provide the required one or more metrics. The target interface 113 can be defined based on user requirements entered via screen 1860 of FIG. 18D, for example. In accordance with one or more embodiments, the target interface 113 can be defined to be the metric-stars identified in the user-defined requirements. Alternatively, the target interface 113 can be defined based on user requirements, which can be optimized using one or more optimization criteria (e.g., response time or space utilization optimization).

Referring to FIG. 18D again, a list of defined dimensions are shown, together with metrics for those dimensions. For example, a Test1 requirement shown defines a metric-star which identifies a linkviews metric grouped by month, and by link position. This metric-star can be expressed as (linkviews, (month, link position)). As another example, a traffic requirement, which includes three metric-stars: (linkviews, (day)), (page views (day)) and (uniqueBcookies, (day)), indicates that users would like to have the linkviews, page views, and uniqueBcookies metrics by day.

In accordance with at least one embodiment, second tier 116 transformations can be determined using a star graph. FIG. 19, which comprises FIGS. 19A to 19C, provides examples of dimensions, hierarchies, metric-stars, roll-up operations, bridge interface 112, target interface 113, a star graph, and second tier transformations of a BISKIT system in accordance with one or more embodiments of the disclosure.

For the sake of the following discussion, dimension hierarchy, metric-star, etc. can be illustrated using relational database constructs. Referring to FIG. 19A, for example, a time dimension hierarchy, Time1, can be represented as a relational database table, Table_Time_1, which includes a column for each of the day, month and year time dimensions. Such a relational table can be thought of as containing all of the values associated with the day, month and year dimensions. For example, the Table_Time_1 table would include a row for each day of each month of each year. Similarly, the Table_Metric provides a relational database table example for the page views metric-star, which can include a page views metric value by day, by spaceid dimension values. FIG. 19A also includes a relational representation of the metric-stars of the target interface 113 corresponding to the user-defined requirements. For example, Table_A, which provides a relational representation of a page views metric-star by day, by pageType, can include a row for each page views metric value by day and pageType. Similarly, the Table_B can include a row for each page views metric value by month dimension value, and Table_C can include a row for each page views metric value by year, by spaceid.

FIG. 19B provides an example of a star graph 1909 based on defined dimensions and hierarchies. The page views metric is represented as pv in the star graph shown in FIG. 19B. In addition and in order to simplify its presentation, some metric-stars and related edges are not included in the star graph 1909, e.g., (pv, (day, *)), (pv, (*, pageType)), (pv,(*, pageLevel)).

In accordance with embodiments of the present disclosure, a star graph can be represented using any type of data structure which can preserve the star graph's structure and allows for traversal of the star graph. The star graph can be traversed between a metric-star of the bridge interface 112 and a metric-star of the target interface 113 to identify one or more transformations of the second tier 116. A traversal path can be used to identify second tier 116 transformations. To illustrate by way of a non-limiting example, nodes 1910 of FIG. 19B represents a metric-star defined in bridge interface 112, and node 1912 represents a metric-star defined as a user requirement for target interface 113. Both metric-stars involve the page views metric. As represented by node 1912, there is a requirement to provide the page views metric grouped by day and pageType, the latter of which is not a most granular dimension. In order to satisfy the requirement, a data aggregation represented by line 1913 between nodes 1910 and 1912 is to be performed to roll the spaceid dimension into the pageType dimension in the Page1 dimension hierarchy. A second tier 116 transformation can be used to identify the metric, associated dimensions and aggregation (e.g., roll-up) function. The transformation associated with this example requirement can be expressed as an SQL statement 1930 of FIG. 19C.

In the example SQL representation, the "select" clause can be used to identify metrics and/or dimensions defined in target interface 113, the "From" clause identifies a relational database table (e.g., Table_Time1, Table_Page1, etc. discussed above) representing metric-stars of bridge interface 112 and relevant hierarchies, the "Where" clause defines table joins performed on the most granular dimensions in bridge interface 112, and the "Group By" clause identifies target interface 113 dimensions.

Referring to SQL statement 1930, an aggregate page views metric (i.e., aggregated by virtue of a roll-up operation on the Page1 hierarchy using a sum operation) is defined by a selection of the page views metric and the day and pageType dimensions from a join of the Table_Time1, Table_Page1 and Table_Metric tables on the day and spaceid granular dimensions, with the page view metric value being aggregated by day, and by pageType. In other words and for any given day and pageType, the page views metric represents a total number of page views for that day and type of page. The SQL statement 1930 can be used to populate Table_A with page views, day and pageType data.

By way of another non-limiting example, node 1914 of star graph 1909 represents, for any given month, the page views metric represents the number of page views in that month. Star graph 1909 provides a graphical depiction of a second tier 116 transformation associated with this requirement. As shown, a roll-up operation is performed on the dimensions in both the Time1 and Page1 dimension hierarchies, such that the day dimension is rolled-up into the month dimension, and the space id, pageType, pageLevel and pageTemplate dimensions are rolled-up into the "*" dimension. FIG. 19C represents the transformation in the SQL statement 1940, which can be used to select data to populate Table_A.

By way of yet another non-limiting example, node 1916 of star graph 1909 represents, for any given year and spaceid, the page views metric represents the number of page views for that year and type of space. Star graph 1909 provides a graphical depiction of a second tier 116 transformation associated with this requirement. As shown, a roll-up operation is performed on the dimensions in the Time1 dimension hierarchy, such that the day and month dimensions are rolled-up into the year dimension. FIG. 19C represents the transformation in the SQL statement 1960, which can be used to populate Table_C.

Those skilled in the art will recognize that the methods and systems of the present disclosure may be implemented in many manners and as such are not to be limited by the foregoing exemplary embodiments and examples. In other words, functional elements being performed by a single or multiple components, in various combinations of hardware and software or firmware, and individual functions, can be distributed among software applications at either the client or server level or both. In this regard, any number of the features of the different embodiments described herein may be combined into single or multiple embodiments, and alternate embodiments having fewer than or more than all of the features herein described are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, and those variations and modifications that may be made to the hardware or software or firmware components described herein as would be understood by those skilled in the art now and hereafter.

The invention claimed is:

1. A method comprising the steps of:
   defining a first interface of a logical model architecture comprising one or more dimensions and/or measures;
   defining a second interface of said logical model architecture comprising metrics, and associations between said metrics and said one or more dimensions and/or measures;
   defining a third interface of said logical model architecture comprising a plurality of user data requirements corresponding to at least one of said metrics and at least one of said dimensions and/or measures;

defining, a first set of transformations of said logical model architecture via a computing device, comprising one or more transformations to map source data items to said one or more dimensions and/or measures of said first interface;

defining, a second set of transformations of said logical model architecture via the computing device, each transformation of said second transformation set corresponding to at least one of said user data requirements and communicated to a data repository maintained on a computer-readable storage medium for populating the data repository with data to satisfy said corresponding user data requirement;

defining, via the computing device, at least one star graph having nodes, each node corresponding to a star identifying at least one of said dimensions, each of said dimensions identified in said star belonging to a dimension hierarchy, an edge between two nodes representing one or more aggregation operations such that each node corresponds to a level of aggregation for each of said dimensions identified by said star; and traversing the star graph so as to determine said level of aggregation level for a metric corresponding to star.

2. The method of claim 1, wherein each of said dimensions represents one of said source data items by which at least one other of said source data items can be grouped.

3. The method of claim 1, wherein each of said measures represents one of said source data items other than those data items represented by said dimensions.

4. The method of claim 1, wherein in said second interface of said logical model, a metric corresponds to a quantifiable piece of information usable in a business intelligent system.

5. The method of claim 1, wherein said second interface at least one of said associations comprises a metric-star, said metric-star identifying one of said metrics and one or more of said dimensions by which said identified metric can be grouped.

6. The method of claim 5, wherein each of said one or more dimensions identified by said metric-star association belongs to a dimension hierarchy having a most granular dimension at a lowest level of the hierarchy, said dimension identified by said metric-star being said most granular dimension.

7. The method of claim 1, wherein in said third interface at least one of said user data requirements comprises a metric-star, said metric-star identifying one of said metrics and one or more of said dimensions by which said identified metric can be grouped.

8. The method of claim 7, wherein each of said one or more dimensions identified by said metric-star belongs to a dimension hierarchy having a most granular dimension at a lowest level of the hierarchy with one or more ancestor dimensions of the most granular dimension, said dimension identified by said metric-star being said most granular dimension or one of said ancestor dimensions.

9. The method of claim 1, wherein in said third interface a metric identified in one of said user data requirements corresponds to one or more output data items of a business intelligent system.

10. The method of claim 9, wherein said business intelligent system comprises reporting and analysis tools which operate on said data repository.

11. The method of claim 1, wherein said one or more aggregation operations comprise a roll-up operation to roll a child dimension into its parent dimension.

12. The method of claim 11, wherein said roll-up operation operates the define a level of aggregation for a metric associated with said child and parent dimensions, such that said associated metric is grouped by said parent dimension.

13. The method of claim 11, wherein said roll-up operation operates to define a level of aggregation corresponding to one or more of said source data items used to determine said metric.

* * * * *

UNITED STATES PATENT AND TRADEMARK OFFICE
CERTIFICATE OF CORRECTION

| | | |
|---|---|---|
| PATENT NO. | : 7,580,944 B2 | Page 1 of 1 |
| APPLICATION NO. | : 11/493950 | |
| DATED | : August 25, 2009 | |
| INVENTOR(S) | : Zhuge et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 481 days.

Signed and Sealed this

Fourteenth Day of September, 2010

David J. Kappos
*Director of the United States Patent and Trademark Office*